US012743827B2

(12) United States Patent
Liu

(10) Patent No.: US 12,743,827 B2
(45) Date of Patent: Sep. 22, 2026

(54) DATA PROCESSING METHOD AND APPARATUS, DEVICE, AND STORAGE MEDIUM

(71) Applicant: HONOR DEVICE CO., LTD., Shenzhen (CN)

(72) Inventor: Zhichao Liu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 87 days.

(21) Appl. No.: 18/840,823

(22) PCT Filed: May 22, 2023

(86) PCT No.: PCT/CN2023/095629
§ 371 (c)(1),
(2) Date: Aug. 22, 2024

(87) PCT Pub. No.: WO2024/045701
PCT Pub. Date: Mar. 7, 2024

(65) Prior Publication Data
US 2025/0166255 A1 May 22, 2025

(30) Foreign Application Priority Data
Aug. 31, 2022 (CN) ......................... 202211064725.8

(51) Int. Cl.
*G06T 11/40* (2006.01)
*G06T 3/18* (2024.01)
(Continued)

(52) U.S. Cl.
CPC ................ *G06T 11/40* (2013.01); *G06T 3/18* (2024.01); *G06T 7/11* (2017.01); *G06T 7/90* (2017.01);
(Continued)

(58) Field of Classification Search
CPC ... G06T 11/40; G06T 3/18; G06T 7/11; G06T 7/90; G06T 11/10; G06T 2207/10024;
(Continued)

(56) References Cited

U.S. PATENT DOCUMENTS 12,182,955 B2 * 12/2024 Aggarwal ............... G06T 17/00
12,524,830 B2 * 1/2026 Jeong ........................ G06T 3/18
(Continued)

FOREIGN PATENT DOCUMENTS

CN 107396111 A 11/2017
CN 112967355 A 6/2021
(Continued)

OTHER PUBLICATIONS

Thaipanich T et al: "Low complexity algorithm for robust video frame rate up-conversion (FRUC) technique", IEEE Transactions On Consumer Electronics, IEEE Service Center, New York, NY, US, vol. 55, No. 1, XP011255279, ISSN: 0098-3063, DOI: 10.1109/TCE.2009.4814438, Feb. 1, 2009 (Feb. 1, 2009), pp. 220-228.
(Continued)

*Primary Examiner* — Vijay Shankar
(74) *Attorney, Agent, or Firm* — WOMBLE BOND DICKINSON (US) LLP

(57) ABSTRACT

This application provides a data processing method and apparatus, a device, and a storage medium. The method includes: processing, when a frame interpolation condition is satisfied between an obtained first real image frame and an obtained second real image frame, the first real image frame to obtain a first image and a mask image used for marking to-be-filled pixels and effective pixels in the first image; sampling mask data of the mask image pixel by pixel to determine whether pixels in the first image are to-be-filled pixels; and using color data of the first real image frame read from an internal memory to perform color filling on the
(Continued)

to-be-filled pixel in the first image, to generate a predicted image frame displayed between the first real image frame and the second real image frame, where color data of the effective pixels in the first image is retained.

20 Claims, 11 Drawing Sheets

(51) Int. Cl.

| | |
|---|---|
| ***G06T 7/11*** | (2017.01) |
| ***G06T 7/90*** | (2017.01) |
| ***G06T 11/10*** | (2026.01) |
| ***H04N 7/01*** | (2006.01) |

(52) U.S. Cl.
CPC ........... *G06T 11/10* (2026.01); *H04N 7/0127* (2013.01); *H04N 7/0137* (2013.01); *H04N 7/014* (2013.01); *G06T 2207/10024* (2013.01)

(58) Field of Classification Search
CPC ........... G06T 15/205; G06T 1/20; G06T 1/60; G06T 15/005; G06T 15/04; H04N 7/0127; H04N 7/0137; H04N 7/014; H04N 19/132; H04N 19/80; H04N 19/86; H04N 19/503
See application file for complete search history.

(56) References Cited

U.S. PATENT DOCUMENTS

| | | | | |
|---|---|---|---|---|
| 2002/0075958 | A1 | 6/2002 | Shiro | |
| 2023/0419570 | A1 | 12/2023 | Chen et al. | |
| 2024/0378844 | A1* | 11/2024 | Yu | G06T 5/77 |
| 2025/0139733 | A1* | 5/2025 | Jeong | G06T 3/18 |
| 2025/0225705 | A1* | 7/2025 | Kozlov | G06T 5/60 |

FOREIGN PATENT DOCUMENTS

| | | | |
|---|---|---|---|
| CN | 112967356 | A | 6/2021 |
| CN | 113726950 | A | 11/2021 |
| CN | 114669047 | A | 6/2022 |
| CN | 116091329 | A | 5/2023 |

OTHER PUBLICATIONS

Guo Jie Guojie@NJU EDU CN et al: ExtraNet, ACM Transactions On Graphics, ACM, NY, US,vol. 40, No. 6,XP058659808,ISSN: 0730-0301, DOI:10.1145/3478513.3480531,Dec. 10, 2021 (Dec. 10, 2021), pp. 1-16.

* cited by examiner

S401: Obtain a first real image frame and a second real image frame

S402: Process, when a frame interpolation condition is satisfied between the first real image frame and the second real image frame, the first real image frame to obtain a first image and a mask image of the first image S403: Sample mask data of the mask image pixel by pixel to determine whether pixels in the first image are to-be-filled pixels Yes → S404: Read, for any one of the to-be-filled pixels in the first image, color data of the first real image frame from an internal memory, and use the color data to perform color filling on the to-be-filled pixel in the first image No → S405: Perform no processing on any effective pixel in the first image, and retain color data of the effective pixel S406: When it is determined that the pixels in the first image have color data, generate a predicted image frame that can be interpolated between the first real image frame and the second real image frame for display

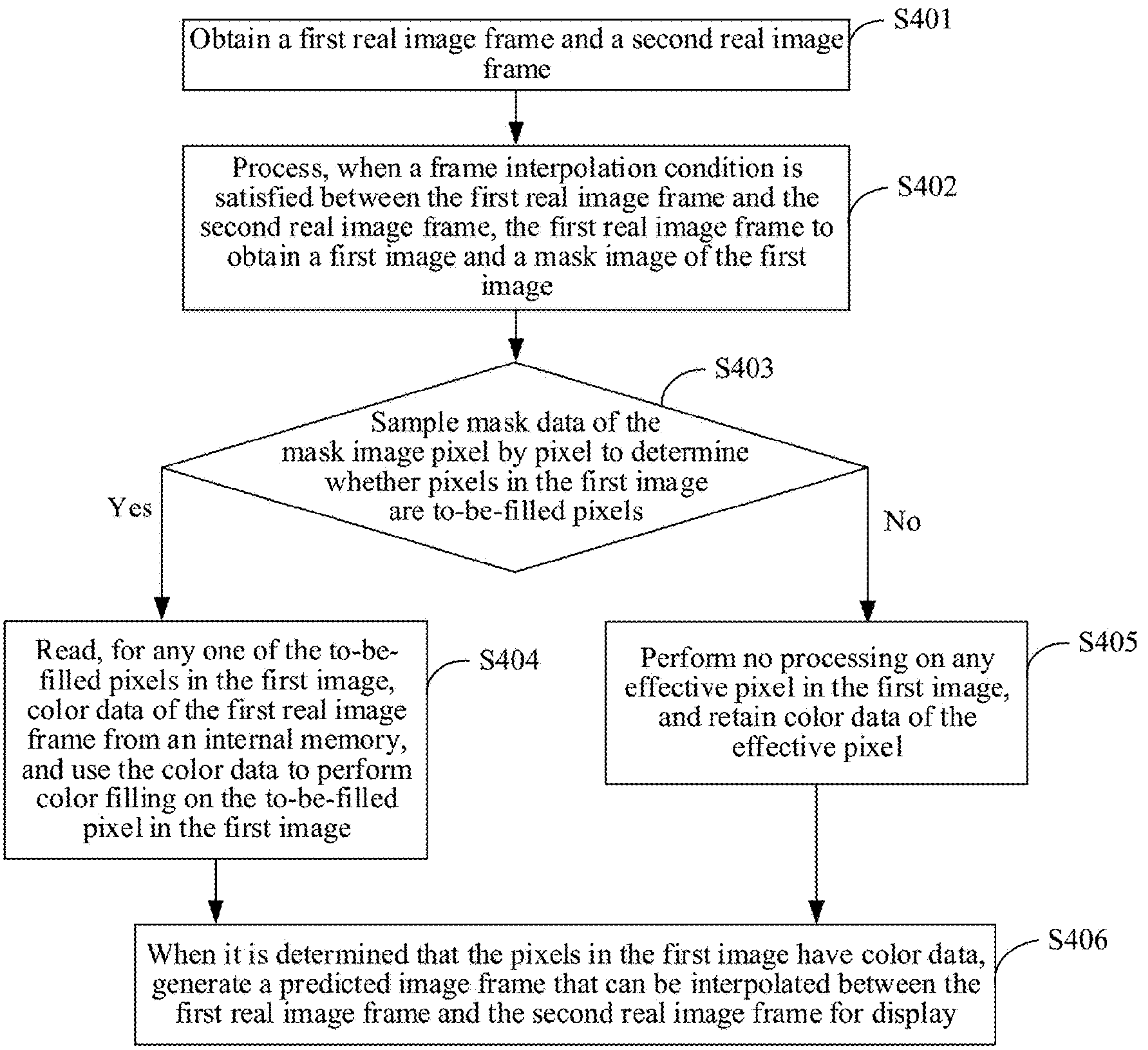

FIG. 4

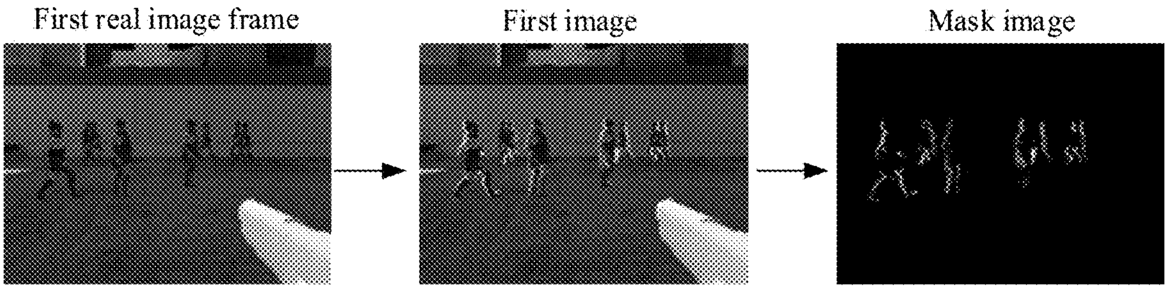

FIG. 5

DATA PROCESSING METHOD AND APPARATUS, DEVICE, AND STORAGE MEDIUM

CROSS-REFERENCE TO RELATED APPLICATIONS

This application is a national stage of International Application No. PCT/CN2022/117088, filed on Sep. 5, 2022, which claims priority to Chinese Patent Application No. 202211064725.8, filed on Aug. 31, 2022, both of which are incorporated herein by reference in their entireties.

TECHNICAL FIELD

This application relates to the field of data processing technologies, and in particular, to a data processing method and apparatus, a device, and a storage medium.

BACKGROUND

With continuous development of computer graphics, image rendering, as a most important research topic in computer graphics, becomes an important technology in image processing. A frame prediction technology is mainly used for increasing a frame rate, reducing frame freezing during image rendering, and reducing game rendering power consumption.

Currently, to reduce to-be-processed data volume during image rendering, a texture compression technology is generally used. However, the texture compression technology can only process image texture data created offline, and needs to perform operations of image texture data reading and rendering target writing a plurality of times online, resulting in high power consumption and a problem of device heating.

SUMMARY

Embodiments of this application provide a data processing method and apparatus, a device, and a storage medium, to resolve problems of high power consumption and device heating during image rendering.

A first aspect of this application provides a data processing method. The method can be performed by a graphics processing unit GPU in an electronic device. When receiving a rendering instruction from a central processing unit CPU, during performing a rendering operation, the GPU may further perform the following data processing method. Optionally, the data processing method includes: The GPU obtains a first real image frame and a second real image frame: processes, when a frame interpolation condition is satisfied between the first real image frame and the second real image frame, the first real image frame to obtain a first image and a mask image of the first image, where the mask image is used for marking to-be-filled pixels and effective pixels in the first image: samples mask data of the mask image pixel by pixel to determine whether pixels in the first image are to-be-filled pixels during performing pixel filling on the first image; and reads, for any one of the to-be-filled pixels in the first image, color data of the first real image frame from an internal memory, and uses the color data to perform color filling on the to-be-filled pixel in the first image, to generate a predicted image frame displayed between the first real image frame and the second real image frame, where color data of the effective pixels in the first image is retained.

In this embodiment of this application, when the frame interpolation condition is satisfied between the two neighboring real image frames generated by the GPU, the first real image frame is processed to generate the first image having the to-be-filled pixels and the mask image corresponding to the first image. In this way, during performing the pixel filling on the to-be-filled pixels in the first image, the mask data in the mask image is sampled to determine the to-be-filled pixels and the effective pixels in the first image, so that the effective pixels are not processed. The color data of the effective pixels in the first image is retained. For any one of the to-be-filled pixels in the first image, the color data of the first real image frame is read from the internal memory, and the color data is used to perform the color filling on the to-be-filled pixel with missing pixel data in the first image, to obtain the predicted image frame used for display between the first real image frame and the second real image frame. The predicted image frame is generated for frame interpolation display to improve a display frame rate of an image. In addition, during image rendering, data filling is only performed on the to-be-filled pixels in the first image, and the effective pixels in the first image are retained. Intermediate data of a pixel filling algorithm is reused, to significantly reduce a quantity of memory accesses and data volume of a single memory access, effectively reduce power consumption of a device, and resolve a problem of device heating while ensuring integrity of a color of the predicted image frame.

In a possible implementation of the first aspect, the frame interpolation condition includes that a moving distance between two consecutive real image frames is less than a distance threshold and there is no translucent object in a real image frame. The frame interpolation condition is set to enable the GPU to perform frame interpolation processing when the frame interpolation condition is satisfied, to ensure a quality of the generated predicted image frame, thereby improving a visual effect of an image.

Optionally; after the obtaining a first real image frame and a second real image frame, the method further includes: determining whether there is a translucent object in the first real image frame: calculating a first moving distance between the first real image frame and the second real image frame in response to that there is no translucent object in the first real image frame; determining whether the first moving distance is less than the distance threshold: determining, in response to that the first moving distance is less than the distance threshold, that the frame interpolation condition is satisfied between the first real image frame and the second real image frame; and determining, in response to that there is a translucent object in the first real image frame and/or the first moving distance is greater than or equal to the distance threshold, that the frame interpolation condition is not satisfied between the first real image frame and the second real image frame.

It may be understood that in actual application, an execution order of the two frame interpolation conditions is not limited and may be determined according to an actual scenario.

In the possible implementation, when there is no translucent object in the first real image frame and the first moving distance between the first real image frame and the second real image frame is less than the distance threshold, it is determined that the frame interpolation condition is satisfied between the first real image frame and the second real image frame. However, when there is a translucent object in the first real image frame and/or the first moving distance is greater than or equal to the distance threshold, it is determined that the frame interpolation condition is not satisfied between the first real image frame and the second real image frame. In this way, occurrence of a poor-quality predicted image frame can be effectively reduced or avoided, and an objective of ensuring frame interpolation quality when a frame rate is improved is achieved.

In a possible implementation of the first aspect, the reading color data of the first real image frame from an internal memory, and using the color data to perform color filling on the to-be-filled pixel in the first image includes: determining at least one candidate reference pixel of the to-be-filled pixel in the first image: determining a target reference pixel from the at least one candidate reference pixel based on object categories to which candidate reference pixels respectively belong: determining, based on a relationship between the target reference pixel and the first real image frame, color data of the target reference pixel by reading the internal memory; and performing the color filling on the to-be-filled pixel based on the color data of the target reference pixel.

In the possible implementation, during performing the color filling on the to-be-filled pixel in the first image based on the color data of the effective pixels in the first real image frame, the candidate reference pixel is determined first, and then the target reference pixel is determined based on the object categories to which the pixels belongs, and the color data of the target reference pixel is read from the internal memory; to implement the color filling on the to-be-filled pixel. In other words, the color data of the target reference pixel is read from the internal memory, to significantly reduce a quantity of memory accesses and data volume of a single memory access and effectively reduce power consumption of a device while ensuring integrity of a color of the predicted image frame.

Optionally, the determining a candidate reference pixel of the to-be-filled pixel in the first image includes: randomly moving to a first position in the first image with a position of the to-be-filled pixel as a starting point: determining, if a pixel at the first position is not a to-be-filled pixel, that the pixel at the first position is the candidate reference pixel of the to-be-filled pixel; and if the pixel at the first position is a to-be-filled pixel, continuing to randomly move in the first image with the first position as the starting point until moving to a second location where a pixel is not a to-be-filled pixel, and determining the pixel at the second position as the candidate reference pixel of the to-be-filled pixel. In this embodiment, the candidate reference pixel of the to-be-filled pixel may be determined through random movement search, to lay a foundation for subsequent determining of the target reference pixel.

Optionally, the performing the color filling on the to-be-filled pixel based on the color data of the target reference pixel includes: determining effective color data of the target reference pixel based on a weight corresponding to the target reference pixel and the color data of the target reference pixel; accumulating the effective color data into existing color data of the to-be-filled pixel until a quantity of color accumulations of the to-be-filled pixel is equal to a first threshold to obtain current color data of the to-be-filled pixel; dividing the current color data by the first threshold to obtain first color data of the to-be-filled pixel; and writing the first color data to a position of the to-be-filled pixel in the first image. A weight value based on the target reference pixel is defined based on a distance between the to-be-filled pixel and the target reference pixel. In this way, the effective color data of the target reference pixel may be accurately determined, and then actual color data to be filled into the to-be-filled pixel is obtained based on the quantity of color accumulations of the first threshold. This can improve a color quality of the to-be-filled pixel, to further ensure a filling effect.

In a possible implementation of the first aspect, the processing the first real image frame to obtain a first image and a mask image of the first image includes: using, based on object categories to which pixels in the first real image frame respectively belong, a motion vector to perform an image warp operation twice on the first real image frame to generate the first image; and generating the mask image of the first image based on whether color data exists for the pixels in the first image. In the possible implementation, a pixel of a static object and a pixel of a dynamic object in the first real image frame are offset respectively, and the mask image of the first image is generated based on whether the pixels in the first image are covered after two offsets, in other words, whether there is the color data. In this way, the mask image that can be generated can accurately mark the to-be-filled pixels and the effective pixels in the first image.

In a possible implementation of the first aspect, the processing the first real image frame to obtain a first image and a mask image of the first image includes: generating a stencil buffer of the first real image frame based on the object categories to which the pixels in the first real image frame respectively belong: querying the stencil buffer, and determining object categories to which pixels in a mask texture image respectively belong, where the mask texture image is an image of which initial values are all equal to a first value, and the first value is used for marking the to-be-filled pixels in the first image; and using, based on the object categories to which the pixels respectively belong, a motion vector to perform an image warp operation twice on both the first real image frame and the mask texture image to generate the first image and the mask image of the first image. In the possible implementation, the mask image is generated by displacing, based on the object categories to which the pixels in the first real image frame respectively belong, the mask texture image of which initial values are all equal to the first value. A displacement process of the mask image is the same as that of the first image, so that the mask image can accurately mark the to-be-filled pixels and the effective pixels in the first image.

Optionally, the using, based on the object categories to which the pixels respectively belong, a motion vector to perform an image warp operation twice on both the first real image frame and the mask texture image to generate the first image and the mask image of the first image includes:

using a multiple render targets MRT technology to perform a first image warp operation corresponding to the motion vector simultaneously on pixels in the first real image frame belonging to a first object category and pixels in the mask texture image belonging to the first object category to generate a warped first real image frame and a warped mask texture image; and performing a second image warp operation corresponding to the motion vector simultaneously on pixels in the warped first real image frame belonging to a second object category and pixels in the warped mask texture image belonging to the second object category to generate the first image and the mask image of the first image, where the first object category is a static object, and the second object category is a dynamic object, or the first object category is a dynamic object, and the second object category is a static object. When the motion vector is used to perform pixel or pixel block movement on the first real image frame to generate rendered data of the first image and rendered data of the mask image, data is simultaneously stored into different internal memory regions using the MRT technology, to simultaneously generate the first image and the mask image corresponding to the first image, to improve image generation efficiency, so that data processing efficiency during image rendering is improved.

In a possible implementation of the first aspect, the sampling mask data of the mask image pixel by pixel to determine whether pixels in the first image are to-be-filled pixels includes: sampling mask data of pixels in the mask image pixel by pixel; determining, if the mask data of the sampled pixels is equal to the first value in the mask image, that a pixel at a corresponding position in the first image is a to-be-filled pixel; and determining, if the mask data of the sampled pixels is equal to a second value, that the pixel at the corresponding position in the first image is not a to-be-filled pixel. The mask data of the pixels in the mask image is sampled to determine, based on a value of the mask data, whether the pixel at the corresponding position in the first image is a to-be-filled pixel, to lay a foundation for subsequent targeted pixel filling.

Optionally; the mask image is a binary image, the first value is equal to 1, and the second value is equal to 0. When the mask data of the pixels in the mask image is represented by 1 and 0, the mask image is a single-channel 8-bit mask image. For the pixels that do not need to be filled in the first image, only a read operation needs to be performed on 8-bit Mask data once, instead of a read operation and a write operation on 32-bit image data once. This reduces data volume of a memory access.

A second aspect of this application provides a data processing apparatus. The data processing apparatus may be implemented by a graphics processing unit GPU in an electronic device. Optionally, the data processing apparatus includes:

an obtaining unit, configured to obtain a first real image frame and a second real image frame;

a processing unit, configured to process, when a frame interpolation condition is satisfied between the first real image frame and the second real image frame, the first real image frame to obtain a first image and a mask image of the first image, where the mask image is used for marking to-be-filled pixels and effective pixels in the first image, and the processing unit is configured to sample mask data of the mask image pixel by pixel to determine whether pixels in the first image are to-be-filled pixels; and a filling unit, configured to read, for any one of the to-be-filled pixels in the first image, color data of the first real image frame from an internal memory, and use the color data to perform color filling on the to-be-filled pixel in the first image, to generate a predicted image frame displayed between the first real image frame and the second real image frame, where color data of the effective pixels in the first image is retained.

In a possible implementation of the second aspect, the frame interpolation condition includes that a moving distance between two consecutive real image frames is less than a distance threshold and there is no translucent object in a real image frame.

Optionally, after the obtaining unit obtains the first real image frame and the second real image frame, the processing unit is further configured to perform the following operations: determining whether there is a translucent object in the first real image frame: calculating a first moving distance between the first real image frame and the second real image frame in response to that there is no translucent object in the first real image frame: determining whether the first moving distance is less than the distance threshold: determining, in response to that the first moving distance is less than the distance threshold, that the frame interpolation condition is satisfied between the first real image frame and the second real image frame; and determining, in response to that there is a translucent object in the first real image frame and/or the first moving distance is greater than or equal to the distance threshold, that the frame interpolation condition is not satisfied between the first real image frame and the second real image frame.

In a possible implementation of the second aspect, when the color data of the first real image frame is read from the internal memory; and the color data is used to perform the color filling on the to-be-filled pixel in the first image, the filling unit is specifically configured to: determine at least one candidate reference pixel of the to-be-filled pixel in the first image; determine a target reference pixel from the at least one candidate reference pixel based on object categories to which candidate reference pixels respectively belong: determine, based on a relationship between the target reference pixel and the first real image frame, color data of the target reference pixel by reading the internal memory; and perform the color filling on the to-be-filled pixel based on the color data of the target reference pixel.

Optionally, when the candidate reference pixel of the to-be-filled pixel is determined in the first image, the filling unit is specifically configured to: randomly move to a first position in the first image with a position of the to-be-filled pixel as a starting point: determine, if a pixel at the first position is not a to-be-filled pixel, that the pixel at the first position is the candidate reference pixel of the to-be-filled pixel; and if the pixel at the first position is a to-be-filled pixel, continue to randomly move in the first image with the first position as the starting point until moving to a second location where a pixel is not a to-be-filled pixel, and determining the pixel at the second position as the candidate reference pixel of the to-be-filled pixel.

Optionally, when the color filling is performed on the to-be-filled pixel based on the color data of the target reference pixel, the filling unit is specifically configured to: determine effective color data of the target reference pixel based on a weight corresponding to the target reference pixel and the color data of the target reference pixel; accumulate the effective color data into existing color data of the to-be-filled pixel until a quantity of color accumulations of the to-be-filled pixel is equal to a first threshold to obtain current color data of the to-be-filled pixel; divide the current color data by the first threshold to obtain first color data of the to-be-filled pixel; and write the first color data to a position of the to-be-filled pixel in the first image.

In a possible implementation of the second aspect, when the first real image frame is processed to obtain the first image and the mask image of the first image, the processing unit is specifically configured to: use, based on object categories to which pixels in the first real image frame respectively belong, a motion vector to perform an image warp operation twice on the first real image frame to generate the first image; and generate the mask image of the first image based on whether color data exists for the pixels in the first image.

In a possible implementation of the second aspect, when the first real image frame is processed to obtain the first image and the mask image of the first image, the processing unit is specifically configured to: generate a stencil buffer of the first real image frame based on the object categories to which the pixels in the first real image frame respectively belong: query the stencil buffer, and determine object categories to which pixels in a mask texture image respectively belong, where the mask texture image is an image of which initial values are all equal to a first value, and the first value is used for marking the to-be-filled pixels in the first image; and use, based on the object categories to which the pixels respectively belong, a motion vector to perform an image warp operation twice on both the first real image frame and the mask texture image to generate the first image and the mask image of the first image.

Optionally, when, a motion vector is used based on the object categories to which the pixels respectively belong to perform the image warp operation twice on both the first real image frame and the mask texture image to generate the first image and the mask image of the first image, the processing unit is specifically configured to: use a multiple render targets MRT technology to perform a first image warp operation corresponding to the motion vector simultaneously on pixels in the first real image frame belonging to a first object category and pixels in the mask texture image belonging to the first object category to generate a warped first real image frame and a warped mask texture image; and perform a second image warp operation corresponding to the motion vector simultaneously on pixels in the warped first real image frame belonging to a second object category and pixels in the warped mask texture image belonging to the second object category to generate the first image and the mask image of the first image, where the first object category is a static object, and the second object category is a dynamic object, or the first object category is a dynamic object, and the second object category is a static object.

In a possible implementation of the second aspect, when the mask data of the mask image is sampled pixel by pixel to determine whether the pixels in the first image are the to-be-filled pixels, the processing unit is specifically configured to: sample mask data of pixels in the mask image pixel by pixel; determine, if the mask data of the sampled pixels is equal to the first value in the mask image, that a pixel at a corresponding position in the first image is a to-be-filled pixel; and determine, if the mask data of the sampled pixels is equal to a second value, that the pixel at the corresponding position in the first image is not a to-be-filled pixel.

Optionally, the mask image is a binary image, the first value is equal to 1, and the second value is equal to 0.

According to a third aspect, an embodiment of this application provides an electronic device, including a memory and a processor. The memory is configured to store a computer program. The processor is configured to execute the computer program, to perform the method according to any one of the first aspect and the possible implementations of the first aspect.

According to a fourth aspect, an embodiment of this application provides a computer-readable storage medium. The computer-readable storage medium stores a computer program or instructions. When the computer program or the instructions run on a computer, the computer is enabled to perform the method according to any one of the first aspect and the possible implementations of the first aspect.

According to a fifth aspect, an embodiment of this application provides a computer program product including a computer program. When the computer program runs on a computer, the computer is enabled to perform the method according to any one of the first aspect and the possible implementations of the first aspect.

According to a sixth aspect, this application provides a chip or a chip system. The chip or the chip system includes at least one processor and a communication interface. The communication interface and the at least one processor are interconnected by a wire. The at least one processor is configured to execute a computer program or instructions to perform the method according to any one of the first aspect or the possible implementations of the first aspect. The communication interface in the chip may be an input/output interface, a pin, a circuit, or the like.

In a possible implementation, the chip or the chip system according to this application further includes at least one memory. The at least one memory stores instructions. The memory may be a storage unit, for example, a register or a cache, inside the chip, or may be a storage unit (for example, a read-only memory or a random access memory) of the chip.

It should be understood that technical solutions of the second aspect to the sixth aspect of this application are corresponding to the technical solutions of the first aspect of this application, and beneficial effects achieved in the aspects and corresponding feasible implementations are similar. Details are not described.

BRIEF DESCRIPTION OF DRAWINGS

FIG. 4 is a schematic flowchart of a data processing method according to an embodiment of this application:

FIG. 5 is a schematic diagram of a mask image generation process:

DESCRIPTION OF EMBODIMENTS

Figure 1:
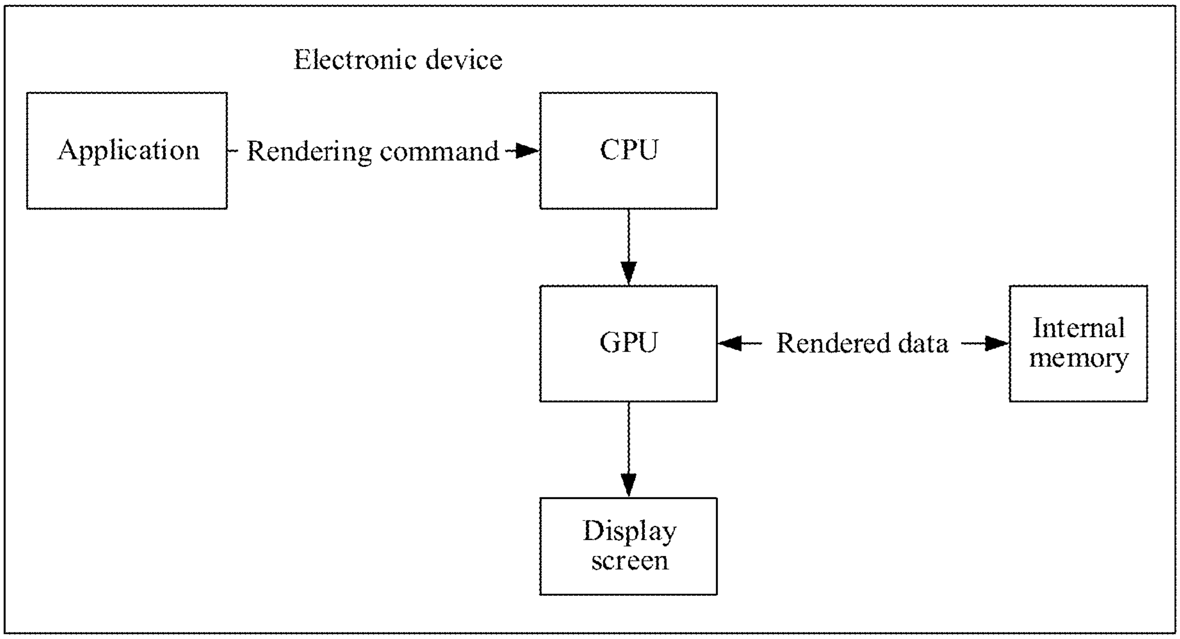
FIG. 1 is a schematic diagram of an image rendering process according to this application.

To describe the technical solutions in embodiments of this application more clearly, the following briefly describes some terms and technologies used in embodiments of this application.

1. Rendering

Rendering refers to a process that software generates an image from a model. The model may be understood as a representation of an object and an item in three-dimensional space, and a three-dimensional object or virtual scene that is strictly defined by a language or a data structure in a to-be-rendered picture. The model includes information such as geometry, a viewpoint, texture, and illumination.

It may be understood that the model is 3D information, the image is 2D information, and an object in the image is a pixel range covered by a 3D model projected onto a 2D image.

2. Texture Data

Texture data refers to data that may be recognized and processed by a graphics card. There are a plurality of formats of the texture data. For example, a format of the texture data may be an RGB format, an RGBA format, a DirectX texture compression (direct draw surface, DDS) format, or the like.

Image texture data refers to texture data that is not be compressed and encoded. In other words, a data format of the image texture data is a texture format. A data size of the image texture data is used for indicating a quantity of pixels included in the image texture data. For example, if the data size of the image texture data is 128×128, the data size indicates that the image texture data includes 128×128 pixels.

3. To-be-Rendered Data

To-be-rendered data includes model data and material data. The model data refers to coordinate data, position coordinates, normal coordinates, texture coordinates, tangent coordinates, and the like of triangle vertexes in a model including triangular meshes. If a three-dimensional scene includes animation, the model data further includes animation information. The material data may include a highlight map, a material map, a physical color map, a reflectivity map (a ratio of reflection and refraction of a material surface), and the like. In other words, material data stores data by mapping.

4. Rendered Data

Rendered data may include color data and brightness data, in other words, may be data generated during a rendering process of to-be-rendered data.

5. Predicted Frame

In embodiments of this application, a predicted frame is also referred to as a predicted image frame, and the two may be exchanged. In the field of videos and games, the predicted image frame is a main manner to improve a frame rate. A method to generate the predicted image frame is to first calculate a motion vector between two real image frames before and after, and perform pixel or pixel block movement on the real image frames based on the motion vector, to generate the predicted image frame.

6. Mask Image

A mask image refers to an image generated by blocking an image (in whole or in part). The mask image may be used for marking a to-be-processed region in the image.

7. Camera

In the embodiments, a camera is a virtual camera used in a graphics rendering scene. A three-dimensional scene may be observed from a specific angle and a specific direction by the virtual camera, to obtain an appearance display of the virtual scene. Generally, different appearance displays of the virtual scene may be seen by changing an angle and an orientation of the virtual camera.

8. Other Terms:

In embodiments of this application, terms such as "first" and "second" are used to distinguish same or similar items with a basically same function and role. For example, a first chip and a second chip are merely used to distinguish between different chips, and are not intended to limit a sequence thereof. A person skilled in the art may understand that the terms "first", "second", and the like are not intended to limit a quantity and an execution order, and the terms "first", "second", and the like are not limited to be necessarily different.

It should be noted that in embodiments of this application, the terms such as "example" or "for example" are used to represent giving an example, an illustration, or a description. Any embodiment or design solution described as "example" or "for example" in this application should not be construed as being preferred or advantageous over other embodiments or design solutions. In particular, the terms such as "example" and "for example" used herein are intended to present the related concept in a specific implementation.

In embodiments of this application, "at least one" refers to one or more, and "a plurality of" refers to two or more. The term "and/or" describes an association relationship for describing associated objects and represents that three relationships may exist. For example. A and/or B may represent: only A exists, both A and B exist, and only B exists, where A and B may be singular or plural. The character "/" generally represents that the associated object is in an "or" relationship. "At least one of the following items (pieces)" or similar expressions refer to any combination of these items, including any combination of singular item (piece) or plural items (pieces). For example, at least one of a, b, or c may represent: a, b, c, a and b, a and c, b and c, or a, b, and c, where a, b, and c may be singular or plural.

With continuous development of computer graphics, rendering, as a most important research topic in computer graphics is gradually applied to various fields, such as a computer, a video, a game, a film or television special effect, and a visual design. In an application such as a game, modeling, or home designing application that requires a large quantity of complex images and that is in an electronic device used, the electronic device needs to complete a large amount of rendering processing to display the images.

For example, FIG. 1 is a schematic diagram of an image rendering process. As shown in FIG. 1, in an electronic device, when an application program (for example, a game application) needs to display an image, the application program may send rendering commands for the image to a central processing unit (central processing unit, CPU) of the electronic device. The rendering instructions include to-be-rendered data. The CPU may transmit, based on these rendering commands, the to-be-rendered data to a graphics processing unit (graphics processing unit, GPU) of the electronic device to control the GPU to render the image to obtain rendered data. The rendered data may be stored in an internal memory of the electronic device. When the electronic device needs to display an image, the GPU may read rendered data of the image from the internal memory; and control a display screen to display the image.

In an application related to graphics rendering, such as game, virtual simulation, and virtual reality (virtual reality; VR)/augmented reality (augmented reality, AR), the electronic device generally needs to process a large amount of texture data during rendering an image. The texture data is storage data, and occupies a large amount of internal memory. However, when a game and the like need a display screen having a high refresh rate, a display screen in the electronic device has a characteristic of a high refresh rate. In a case of the high refresh rate, texture data with high resolution causes high rendering power consumption of the electronic device, and it is prone to drawing freezing during drawing an image, to cause a problem of displayed image frame freezing.

To reduce image frame freezing and reduce power consumption of picture rendering, a predicted frame technology is developed. A predicted image frame is a predicted image frame generated between two real image frames, and is interpolated between the two real frames to improve a frame rate of a displayed image, to achieve an objective of reducing frame freezing and reducing power consumption of game rendering. The predicted image frame is an image that needs to be interpolated between the two real frames for display, an image quality cannot be affected when the predicted image frame is displayed. In other words, when being displayed to a user, the predicted image frame cannot be inconsistent with an actual scene. Therefore, before generating the image prediction frame in a rendering process, the GPU performs a process of generating the predicted image frame only when determining that a frame can be interpolated.

In a process of calculating the predicted image frame, the GPU needs to perform operations of image texture data reading and rendering target writing a plurality of times, and internal memory operations are frequent. In addition, in an image rendering process on a mobile terminal, due to limitation of a bandwidth transmission capability of the mobile terminal, frequent sampling of image texture data may cause device heating. Therefore, to reduce power consumption and reduce device heating, an internal memory optimization technology is proposed, aiming to reduce power load of a chip and reduce device heating to increase use time of the device.

Currently, to reduce to-be-processed data volume during image rendering, a texture compression technology is generally used. To be specific, image texture data in an offline creation process is first compressed, and the image texture data is read only when the image texture data needs to be used, to reduce a quantity of memory accesses. However, the texture compression technology can only process image texture data created offline, and cannot process calculation process data of the predicted image frame. Operations of image texture data reading and rendering target writing still need to be performed a plurality of times, resulting in high power consumption and a problem of device heating. This seriously affects a service life of the device.

For the foregoing technical problem, a conception process of the technical solution of this application is as follows. The inventor finds in practice that sometimes a moving distance between two real frames is too large or there is a translucent object in a real image frame. In this case, a frame interpolation effect is not good. Therefore, the GPU first determines, before interpolating a frame, that the frame can be interpolated. In addition, during generating the predicted image frame in the field of games, internal memory operations are frequent due to a plurality of operations of texture reading and rendering target writing. In actual application, virtual camera rotation causes missing pixels in an edge region of the predicted image frame, and pixel offset causes a blank region in the predicted image frame. Therefore, when the image rendered data is read from the internal memory and written to the predicted image frame in a conventional manner, there are duplicate data copies. Therefore, an algorithm may be designed to mark duplicated image region data and optimize a subsequent processing algorithm to reduce accessed data volume.

Based on the foregoing technical conception process, an embodiment of this application provides a data processing method. After two real image frames are obtained, it is first determined whether a frame interpolation condition is satisfied. If it is determined that the frame interpolation condition is satisfied, a process of generating a predicted image frame is performed. To be specific, when a first real image frame is processed, in addition to generating a predicted image frame having a to-be-filled pixel region, a mask image may be further generated. The mask image is used to mark a blank pixel region (that is, the to-be-filled pixel region) and an effective pixel region (a pixel region that does not need an operation) in the predicted image frame. At a pixel filling stage, based on the mask image, it may be determined whether to perform data filling on pixels in the predicted image frame. If it may be determined to perform the data filling on the pixels in the predicted image frame, a specific operation of the pixel filling is performed. If it may be determined to not perform the data filling on the pixels in the predicted image frame, the data filling is not performed on the pixel. According to the technical solution, during generating the predicted image frame, the mask image is used to mark image regions that need to be processed and that do not need to be processed. Rendered data of a real image frame, that is, intermediate data of the data processing method, may be reused, and no operation is performed on an image region where the rendered data exists. This significantly reduces a quantity of memory accesses and data volume of a single memory access, thereby effectively reducing power consumption of data processing and resolving a problem of device heating. In addition, in this solution, a display frame rate can be improved by generating a predicted image frame for frame interpolation display. In addition, because the interpolated frame, that is, the predicted image frame, is obtained by predicting a motion vector and does not need to be obtained by rendering, rendering workload is small and delay is short.

The solution provided in this embodiment of this application is described below in detail with reference to the accompanying drawings.

It should be noted that the data processing method provided in this embodiment of this application is applied to the electronic device. A terminal device in this embodiment of this application may be any form of a terminal device. For example, the terminal device may include a handheld device having an image processing function, a vehicle-mounted device, or the like. For example, the electronic device may be a mobile phone (mobile phone), a tablet computer, a palmtop computer, a notebook computer, a mobile internet device (mobile internet device, MID), a wearable device, a virtual reality (virtual reality, VR) device, an augmented reality (augmented reality, AR) device, a wireless terminal for industrial control (industrial control), a wireless terminal for self driving (self driving), a wireless terminal for a remote medical surgery (remote medical surgery), a wireless terminal for a smart grid (smart grid), a wireless terminal for transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, a vehicle-mounted device, a wearable device, a terminal device in a 5G network, a terminal device in a future evolved public land mobile network (public land mobile network. PLMN), or the like. This is not limited in this embodiment of this application.

As an example but not a limitation, in this embodiment of this application, the electronic device may alternatively be a wearable device. The wearable device may also be referred to as a wearable smart device, and is a collective term for wearable devices developed by intelligently designing daily wearing based on a wearable technology, for example, glasses, gloves, a watch, clothing, and shoes. A wearable device is a portable device that can be directly worn on a body or integrated into clothes or an accessory of a user. A wearable device is not merely a hardware device, but is used to implement a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, in this embodiment of this application, the electronic device may alternatively be a terminal device in an Internet of Things (Internet of Things, IoT) system. The IoT is an important part of future information technology development. A main technical feature of the IoT is to connect an object to a network by using a communication technology, to implement an intelligent network with a human-machine interconnection and an object-object interconnection.

In this embodiment of this application, the electronic device may also be referred to as a terminal device, user equipment (user equipment. UE), a mobile station (mobile station, MS), a mobile terminal (mobile terminal, MT), an access terminal, a subscriber unit, a subscriber station, a mobile station, a mobile console, a remote station, a remote terminal, a mobile device, a user terminal, a terminal, a wireless communication device, a user agent, a user apparatus, or the like.

In this embodiment of this application, the electronic device or each network device includes a hardware layer, an operating system layer running over the hardware layer, and an application layer running over the operating system layer. The hardware layer includes hardware such as a central processing unit (central processing unit, CPU), a memory management unit (memory management unit, MMU), and a memory (which is also referred to as a main memory). The operating system may be any one or more computer operating systems for implementing service processing through a process (process), for example, a Linux operating system, a Unix operating system, an Android operating system, an iOS operating system, or a Windows operating system. The application layer includes applications such as a browser, an address book, word processing software, and instant messaging software.

It may be understood that no special limitation is imposed on a specific form of the electronic device in this embodiment of this application. In some embodiments, the electronic device may include display functions. For example, the electronic device may render an image based on a rendering command issued by an application program, and display a rendered image to a user.

Figure 2:
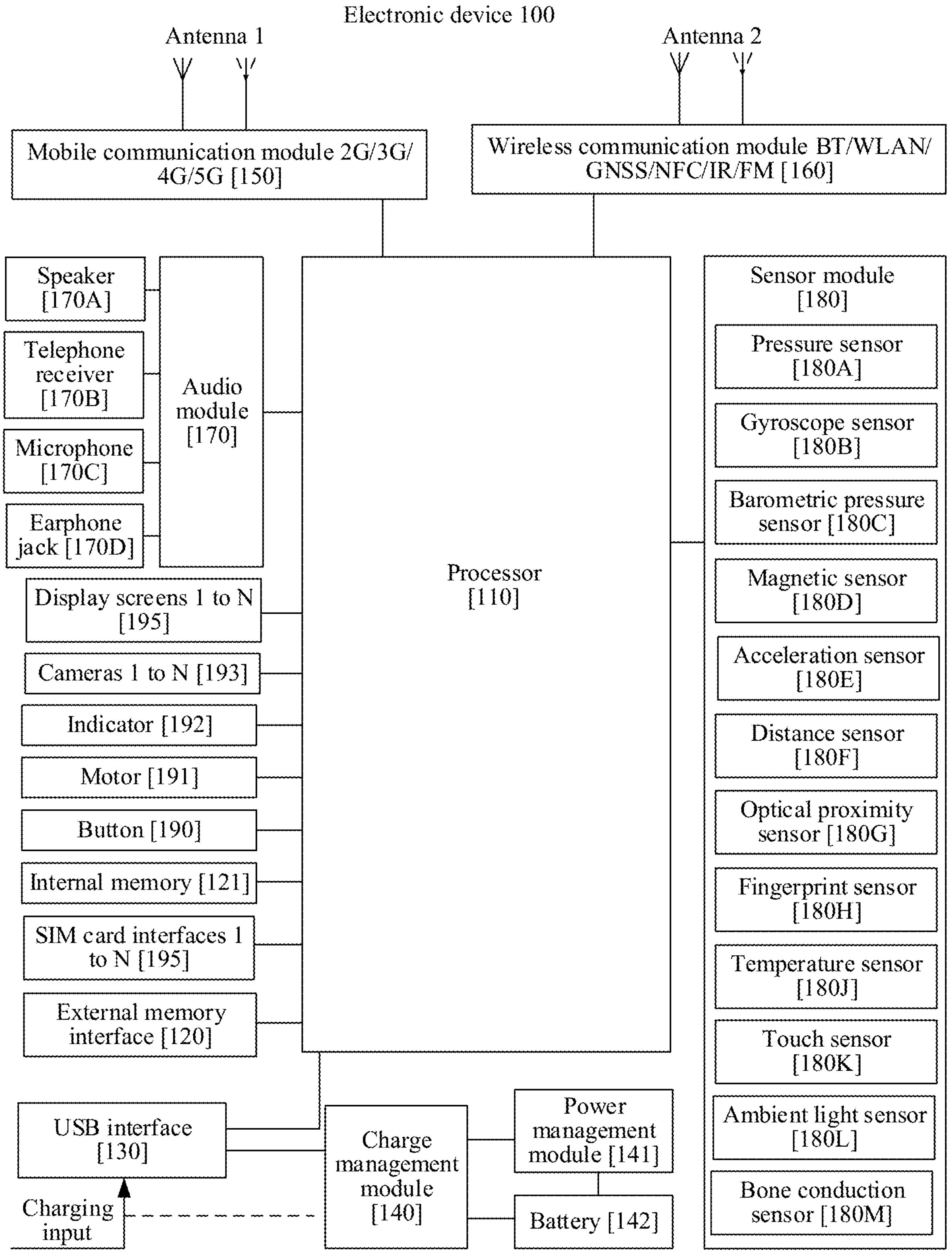
FIG. 2 is a schematic diagram of a structure of an electronic device.

To help better understand this embodiment of this application, the following describes a structure of an electronic device in embodiments of this application;

FIG. 2 is a schematic diagram of a structure of an electronic device. As shown in FIG. 2, the electronic device 100 may include a processor 110, an external memory interface 120, an internal memory 121, a universal serial bus (universal serial bus, USB) interface 130, a charge management module 140, a power management module 141, a battery 142, an antenna 1, an antenna 2, a mobile communication module 150, a wireless communication module 160, an audio module 170, a speaker 170A, a telephone receiver 170B, a microphone 170C, an earphone jack 170D, a sensor module 180, a button 190, a motor 191, an indicator 192, a camera 193, a display screen 194, a subscriber identification module (subscriber identification module, SIM) card interface 195, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory; a video codec, a digital signal processor (digital signal processor, DSP), a baseband processor, a neural-network processing unit (neural-network processing unit, NPU), and/or the like. Different processing units may be separate devices, or may be integrated into one or more processors.

The controller may generate an operation control signal based on an instruction operation code and a timing signal, to control instruction fetching and instruction execution.

A memory may be further disposed in the processor 110 and is configured to store instructions and data. In some embodiments, the memory in the processor 110 is a cache. The memory may store instructions or data recently used or cyclically used by the processor 110. If the processor 110 needs to use the instructions or the data again, the processor may call the instructions or the data from the memory. This avoids repeated access, and reduces a waiting time of the processor 110, to improve system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules illustrated in embodiments of this application is an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The electronic device 100 implements a display function by using the GPU, the display screen 194, the application processor, and the like. The GPU is a microprocessor for image processing and is connected to the display screen 194 and the application processor. The GPU is configured to perform mathematical and geometric calculation for graphics rendering. The processor 110 may include one or more GPUs that execute program instructions to generate or change display information.

The display screen 194 is configured to display an image, a video, and the like. The display screen 194 includes a display panel. The display panel may be a liquid crystal display (liquid crystal display; LCD) panel, an organic light-emitting diode (organic light-emitting diode, OLED) panel, an active-matrix organic light emitting diode (active-matrix organic light emitting diode, AMOLED) panel, a flexible light-emitting diode (flex light-emitting diode, FLED) panel, a Miniled panel, a MicroLed panel, a Micro-oLed panel, a quantum dot light emitting diode (quantum dot light emitting diode, QLED) panel, a low temperature polycrystalline oxide (low temperature polycrystalline oxide, LTPO) panel, or the like. In some embodiments, the electronic device 100 may include 1 or N display screens 194. N is a positive integer greater than 1.

The electronic device 100 may implement a photographing function through the ISP, the camera lens 193, the video codec, the GPU, the display screen 194, the application processor, and the like.

The external memory interface 120 may be configured to be connected to an external storage card such as a micro SD card, to expand a storage capability of the electronic device 100. The external storage card communicates with the processor 110 through the external memory interface 120, to implement a data storage function. For example, data files such as music, a picture, and a video are stored into the external storage card.

The internal storage 121 may be configured to store computer-executable program code, and the executable program code includes instructions. The internal memory 121 may include a program storage area and a data storage area. The program storage area may store an operating system, an application required by at least one function (such as a voice playing function and an image playing function), and the like. The data storage area may store data (for example, audio data and an address book) and the like created when the electronic device 100 is used. In addition, the internal memory 121 may include a high-speed random access memory, and may further include a non-volatile memory, for example, at least one magnetic disk storage device, a flash memory device, or a universal flash storage (universal flash storage, UFS). The processor 110 runs the instructions stored in the internal memory 121, and/or the instructions stored in the memory disposed in the processor, to perform various functional applications and data processing of the electronic device 100.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The button 190 includes a power-on button, a volume button, and the like. The button 190 may be a mechanical button, or may be a touch button. The electronic device 100 may receive a button input, and generate a button signal input related to user settings and function control of the electronic device 100.

It may be understood that a schematic structure in this embodiment of this application does not constitute a specific limitation on the electronic device 100. In some other embodiments of this application, the electronic device 100 may include more or fewer components than those shown in the figure, some components may be combined, some components may be split, or different component arrangements may be used. The components in the figure may be implemented by hardware, software, or a combination of software and hardware.

It is worth noting that a product realization form in this embodiment of this application is a program code included in machine learning and deep learning platform software and deployed on the electronic device. The program code in this embodiment of this application may be stored inside the electronic device. At runtime, the program code runs in a host internal memory of the electronic device and/or an internal memory of the GPU.

In actual application, a software system of the electronic device may use a layered architecture, an event-driven architecture, a microkernel architecture, a microservice architecture, or a cloud architecture. In this embodiment of this application, an Android system with the layered architecture is used as an example to describe a software structure of the electronic device.

Figure 3:
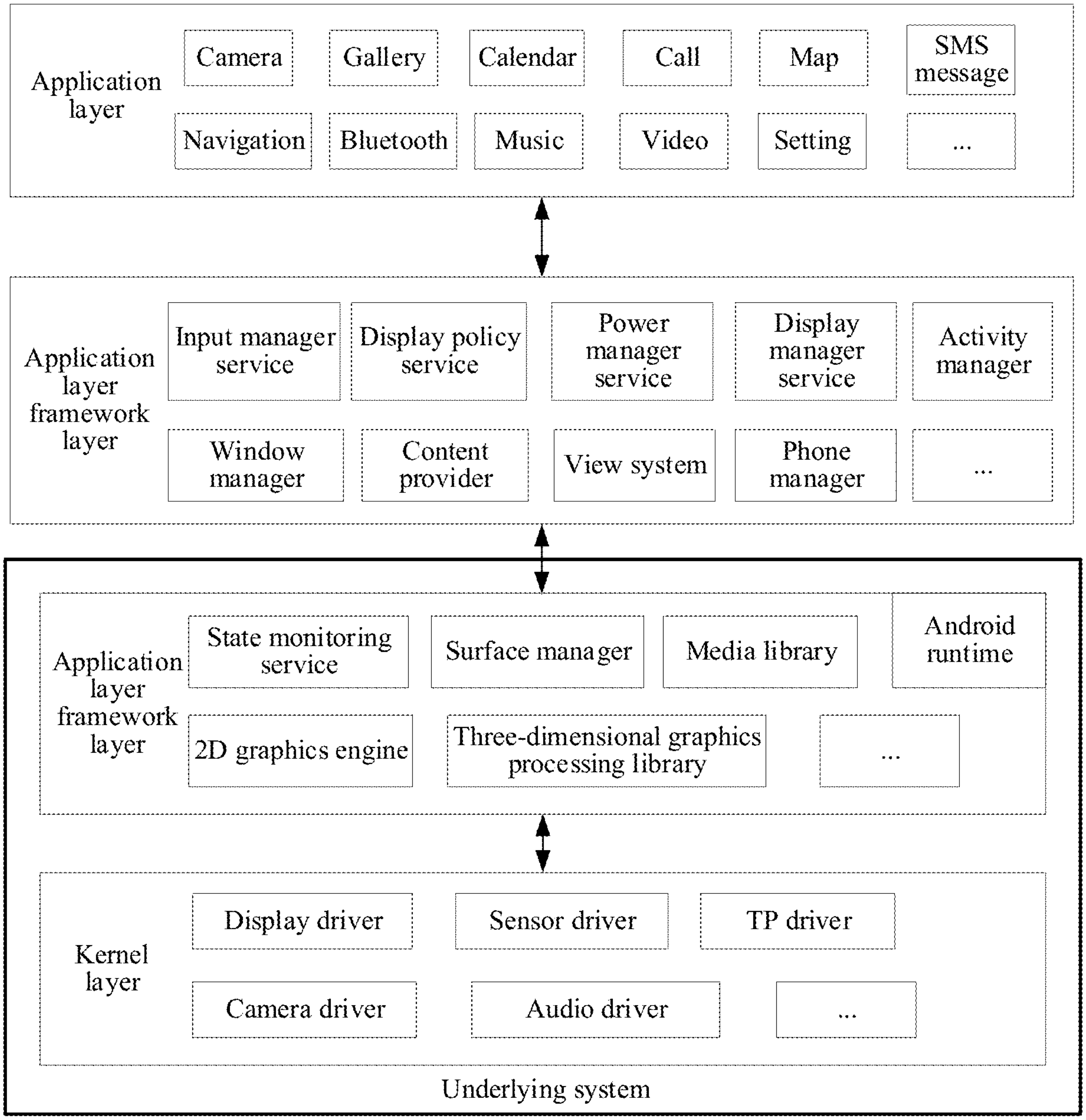
FIG. 3 is a block diagram of a software structure of an electronic device according to an embodiment of this application.

For example, FIG. 3 is a block diagram of a software structure of an electronic device according to an embodiment of this application. As shown in FIG. 3, in a hierarchical architecture of the electronic device, software is divided into several layers, and each layer has a clear role and task. The layers communicate with each other through software interfaces. In some embodiments, the Android system is divided into four layers that are respectively an application layer, an application framework layer, an Android runtime (Android runtime) and system library, and a kernel layer from top to bottom.

The application layer may include a series of application packages.

As shown in FIG. 3, the application layers may include applications such as Camera, Gallery, Calendar, Call, Map, Navigation, SMS message, Bluetooth, Music, Video, and Setting installed therein.

The application framework layer provides an application programming interface (application programming interface, API) and a programming framework for applications at the application layer. The application framework layer includes some predefined functions.

As shown in FIG. 3, the application framework layer may include an input manager service (input manager service, IMS). Certainly, the application program framework layer may further include a display policy service, a power manager service (power manager service, PMS), a display manager service (display manager service, DMS), an activity manager, a window manager, a content provider, a view system, a phone manager, a resource manager, a notification manage, and the like. This is not limited in this embodiment of this application.

The Android runtime (Android runtime) includes a kernel library and a virtual machine. The Android runtime is responsible for scheduling and managing the Android system. The core library includes two parts: one part is a performance function that the Java language needs to invoke, and the other part is a core library of Android.

The application layer and the application framework layer are run in the virtual machine. The virtual machine executes Java files of the application layer and the application framework layer as binary files. The virtual machine is configured to execute functions such as object lifecycle management, stack management, thread management, security and exception management, and garbage collection.

The system library may include a plurality of function modules, for example, a state monitoring service, a surface manager (surface manager), a media library (Media Library), a three-dimensional graphics processing library (for example, an OpenGL ES), a 2D graphics engine (for example, an SGL), and the like. The state monitoring service is used for determining a specific orientation of a mobile phone and a physical state of a flexible screen based on monitoring data reported by a kernel layer.

The surface manager is configured to manage a display subsystem and provide fusion of 2D and 3D layers for a plurality of applications.

The media library supports playback and recording of a plurality of commonly used audio and video formats, and static image files. The media library may support a plurality of audio and video encoding formats, such as MPEG4, H.264, MP3, AAC, AMR, JPG, and PNG.

The three-dimensional graphics processing library is used for implementing three-dimensional graphics drawing, image rendering, composition, layer processing, and the like. The 2D graphics engine is a drawing engine for 2D drawing.

The kernel layer is a layer between hardware and software. The kernel layer includes at least a display driver, a sensor driver, a TP driver, a camera driver, an audio driver, and the like. This is not limited in this embodiment of this application.

Optionally; as shown in FIG. 3, the system library, the kernel layer, and the like below the application framework layer may be referred to as an underlying system. The underlying system includes an underlying display system configured to provide a display service. For example, the underlying display system includes a display driver in the kernel layer, a surface manager in the system library, and the like.

The technical solution in this application is described in detail by using a specific embodiment with reference to the schematic diagrams shown in FIG. 1 to FIG. 3. To be specific, a predicted image frame generation process during image rendering is described. It should be noted that the following several specific embodiments may be combined with each other, and the same or similar concepts or processes may not be described repeatedly in some embodiments.

It may be understood that in this embodiment, refer to the schematic diagram described in FIG. 1. The internal memory stores rendered data of a specific real image frame. The GPU can perform the technical solution provided in this embodiment of this application based on the real image frame and the rendered data of the real image frame stored in the internal memory to generate a predicted image frame.

For example, FIG. 4 is a schematic flowchart of a data processing method according to an embodiment of this application. In this embodiment, an example in which the electronic device is a GPU is used for description. As shown in FIG. 4, in this embodiment, the data processing method may include the following steps.

S401: Obtain a first real image frame and a second real image frame.

The first real image frame and the second real image frame are images generated by the GPU after performing a rendering operation based on obtained to-be-rendered data. During image rendering, rendered data of the first real image frame and the second real image frame are stored in an internal memory.

It may be understood that the to-be-rendered data is data in a rendering command sent by a target application to a CPU, and is data transmitted from the CPU to the GPU during the image rendering. For example, the target application may be a game application, a virtual simulation application, and another related application that needs high refresh rate display.

In actual application, the first real image frame and the second real image frame may be any two consecutive real image frames among a plurality of image frames generated by the GPU based on the to-be-rendered data. Generally, these real image frames are generated in chronological order. Different image frames may include different quantities of rendered objects. Therefore, rendered data of the plurality of real image frames may be stored in the internal memory. This is not limited in this embodiment of this application.

S402: Process, when a frame interpolation condition is satisfied between the first real image frame and the second real image frame, the first real image frame to obtain a first image and a mask image of the first image.

The mask image is used for marking to-be-filled pixels and effective pixels in the first image.

For example, in the mask image, a first value is used for marking the to-be-filled pixels in the first image, and a second value is used for marking the effective pixels in the first image.

In this embodiment of this application, after the GPU generates rendered data of a real image frame based on the rendering command of the CPU, it may determine, based on preset configuration information, whether a frame interpolation condition is satisfied between two consecutive real image frames. If it may determine, based on the preset configuration information, that the frame interpolation condition is satisfied between the two consecutive real image frames, a determined motion vector is used to perform pixel or pixel block movement on the obtained first real image frame to generate the first image. If it may determine, based on the preset configuration information, that the frame interpolation condition is not satisfied between the two consecutive real image frames, the technical solution of this application is not performed, and a process of rendering the real image frames is directly performed.

Optionally; the frame interpolation condition may include that a moving distance between two consecutive real image frames is less than a preset distance threshold and there is no translucent object in a real image frame. To be specific, if the moving distance between the two real image frames is greater than or equal to the preset distance threshold, there is too much missing pixel information between the two neighboring real frames, and the missing pixel information cannot be restored by using the two real image frames. If frame interpolation is performed in this case, a generated predicted image frame is inconsistent with the two real image frames before and after, so that user visual experience is poor. If there is a translucent object in the real image frame, processing A channel data of a pixel damages a visual effect of an original image, so that the frame interpolation cannot be performed.

It may be understood that whether there is a translucent object in the real image frame may be understood as whether there is an object of which transparency is greater than a transparency threshold in the real image frame. The transparency threshold may be preset in the GPU by a user based on an actual scenario. Details are not described herein. The object in the image may also be interpreted as an item, or the like. This is not limited in this embodiment.

In this embodiment of this application, after obtaining the first real image frame and the second real image frame, the GPU may first determine whether there is a translucent object in the first real image frame. If the GPU may first determine that there is a translucent object in the first real image frame, it is determined that the frame interpolation condition is not satisfied between the first real image frame and the second real image frame. If the GPU may first determine that there is no translucent object in the first real image frame, a first moving distance between the first real image frame and the second real image frame is calculated, and it is determined whether the first moving distance is less than a distance threshold. If it is determined that the first moving distance is less than the distance threshold, it is determined that the frame interpolation condition is satisfied between the first real image frame and the second real image frame. If it is determined that the first moving distance is greater than or equal to the distance threshold, it is determined that the frame interpolation condition is not satisfied between the first real image frame and the second real image frame.

It may be understood that an order of determining the two conditions is not limited in this embodiment of this application. To be specific, the GPU may alternatively calculate the first moving distance between the first real image frame and the second real image frame first, determine whether the first moving distance is less than the distance threshold, and then determine whether there is a translucent object in the real image frame. The order of determining the two conditions may be determined according to an actual scenario. Details are not described herein.

In other words, when there is no translucent object in the first real image frame and the first moving distance between the first real image frame and the second real image frame is less than the distance threshold, it is determined that the frame interpolation condition is satisfied between the first real image frame and the second real image frame. When there is a translucent object in the first real image frame and/or the first moving distance between the first real image frame and the second real image frame is greater than or equal to the distance threshold, it is determined that the frame interpolation condition is not satisfied between the first real image frame and the second real image frame.

In this embodiment of this application, the frame interpolation condition is set to enable the GPU to perform frame interpolation processing when the frame interpolation condition is satisfied, to ensure a quality of the generated predicted image frame, thereby improving a visual effect of an image.

In this embodiment of this application, the motion vector may be used to perform the pixel or pixel block movement on the obtained first real image frame to generate the first image. In this embodiment of this application, the first image is an image having a to-be-filled pixel region.

It may be understood that the motion vector may be obtained by estimating a motion vector between two neighboring real image frames, or may be determined based on a motion track of an object in the first real image frame. This is not limited in this embodiment of this application.

Optionally, the to-be-filled pixel region in the first image may include an edge region of a predicted image frame and a blank region of the predicted image frame. The edge region of the predicted image frame is usually caused by virtual camera rotation, and the blank region of the predicted image frame is usually caused by pixel offset. A specific type of the to-be-filled pixel region is not limited in this embodiment of this application.

In this embodiment of this application, when the first real image frame is processed or the first image is processed, the mask image of the first image may be further obtained. The mask image may be a single-channel 8-bit Mask map, used for marking the edge region of the predicted image frame in the first image and a blank region within the image that needs to be performed with pixel filling. In other words, the mask image is used for marking the to-be-filled pixel region in the first image.

It may be understood that in this embodiment, the edge region of the predicted image frame and the blank region inside the predicted image frame that needs to be performed with pixel filling are collectively referred to as the to-be-filled pixel region.

In this embodiment, the mask image of the first image may be generated in different manners, and the mask image and the first image have same pixels and same pixel positions.

In a possible implementation in this embodiment of this application, a motion vector is used based on object categories to which pixels in the first real image frame respectively belong to perform an image warp operation twice on the first real image frame to generate the first image. Then the mask image of the first image is generated based on whether color data exists for the pixels in the first image.

For example, FIG. 5 is a schematic diagram of a mask image generation process. As shown in FIG. 5, motion vector processing is first performed on the first real image frame to generate the first image, and then the mask image of the first image is determined based on whether the pixels in the first image have color data, in other words, whether the pixels is edge pixels or blank pixels.

It may be understood that no color data in the pixels in the first image may be understood as that after pixel offset is performed on pixels covered by a dynamic object based on the motion vector and another pixel offset is performed on pixels covered by a static object, neither two offset results cover the pixels, resulting no color data for the pixels.

In a possible implementation in this embodiment of this application, the first real image frame may be processed by using a multiple render targets (multiple render targets, MRT) technology, to simultaneously generate the first image and the mask image of the first image. For example, after the motion vector is used to perform pixel or pixel block movement on the first real image frame, the first image and the mask image of the first image are generated using the MRT technology.

For example, a stencil buffer of the first real image frame is generated based on the object categories to which the pixels in the first real image frame respectively belong. The stencil buffer is queried, and object categories to which pixels in a mask texture image respectively belong are determined. Then, based on the MRT technology, based on the object categories to which the pixels respectively belong, a motion vector is used to perform an image warp operation twice on both the first real image frame and the mask texture image to simultaneously generate the first image and the mask image of the first image.

Figure 6:
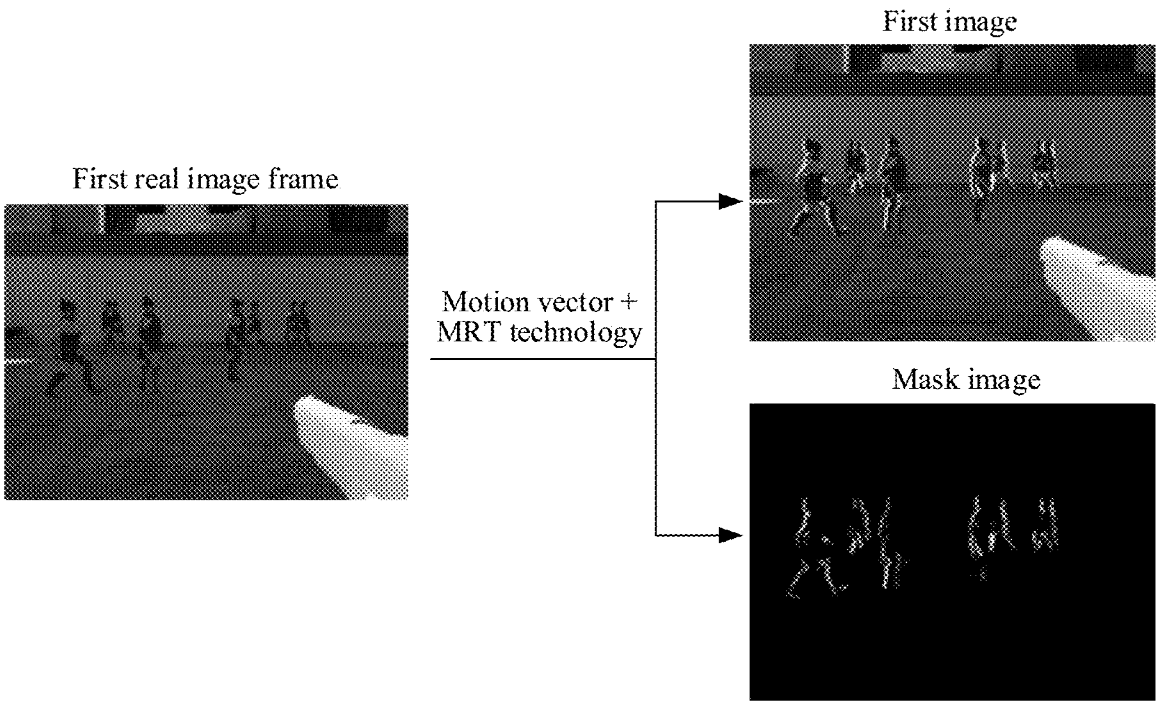
FIG. 6 is a schematic diagram of another mask image generation process.

For example, FIG. 6 is a schematic diagram of another mask image generation process. As shown in FIG. 6, when the motion vector is used to perform pixel or pixel block movement on the first real image frame to generate the first image and rendered data of the mask image, data may be simultaneously stored into different internal memory regions using the MRT technology, to simultaneously generate a plurality of different targets. Therefore, in this embodiment, in a process of using the motion vector to perform the image warp operation on the first real image frame, warped image data may be written into different rendering targets using the MRT technology: For example, the mask image and the first image (a predicted image frame of the first real image frame) may be bound as the rendering targets simultaneously, so that the mask image and the first image having the to-be-filled pixel region may be generated simultaneously.

For example, the following uses an execution environment in this embodiment of this application as openGL for description. It may be understood that the execution environment in this embodiment of this application may alternatively be a vulkan environment. This is not limited in this embodiment of this application.

Specifically, a principle of simultaneously generating a mask image and a first image based on the MRT technology is as follows.

1. A GPU creates a plurality of rendered buffers, for example, creates two rendered buffers, M1 and M2 respectively. The GPU may transmit M1 and M2 as parameters into a current rendering process based on a first call instruction sent by a CPU, for example, a glFramebufferTexture instruction. In this way, a rendering target in the current rendering process is bound to the rendered buffer M1 and the rendered buffer M2 simultaneously. In other words, data may be written to the rendered buffer M1 and the rendered buffer M2 simultaneously.

2. The GPU may call a glDraw Buffers interface based on an interface call instruction of the CPU to specify a quantity of rendered buffers bound to the rendering target. For example, in this embodiment, if the first image and the mask image need to be generated simultaneously, there are two buffers bound to the specified rendering target, for example, the foregoing rendered buffer M1 and rendered buffer M2.

3. In a pixel shader algorithm, because there are two rendering targets specified in this embodiment, the GPU defines two different outputs, color1 and color2. color1 is used for rendering to generate the first image, and color2 is used for rendering to generate the mask image of the first image.

4. The GPU may use, based on a call drawing instruction glDraw Index of the CPU, data of the warped first real image frame to render color1 and color2 simultaneously, and write a rendered result for color1 to the bound rendered buffer M1, and simultaneously write a rendered result for color2 to the bound rendered buffer M2. This achieves an objective of outputting to the rendered buffer M1 and the rendered buffer M2 simultaneously in a rendering process, so that the mask image and the first image are obtained.

S403: Sample mask data of the mask image pixel by pixel to determine whether the pixels in the first image are to-be-filled pixels.

In this embodiment of this application, when it is determined whether the pixels in the first image needs to be performed with data filling, it may be determined based on mask data of pixels at corresponding positions in the mask image. For example, the mask (Mask) data of the pixels (that is, at the pixel positions) in the mask image may be sampled pixel by pixel to determine whether pixels at corresponding positions in the first image are the to-be-filled pixels.

In an optional implementation, a value of the mask data of the pixels in the mask image may first be sampled pixel by pixel. Then, in the mask image, if a value of mask data of a first pixel is equal to a first value, it is determined that a pixel in the first image with a same position as the first pixel is a to-be-filled pixel. If the value of the mask data of the first pixel is equal to a second value, it is determined that the pixel in the first image with the same position as the first pixel is not a to-be-filled pixel. The first pixel is any pixel of the mask image.

For example, the mask image may be a binary image. To be specific, the Mask data of the pixels in the mask image is a value, and is one of two values. The value of the Mask data indicates whether the pixel at the corresponding position in the first image needs to be performed with data filling. For example, in the mask image, the Mask data is equal to the first value to mark a to-be-filled pixel region in the first image, and the Mask data is equal to the second value to mark a pixel region in the first image where the pixel filling operation does not need to be performed. The first value is different from the second value.

As an example, the first value is equal to 1 and the second value is equal to 0. In this case, the device has the following preset provisions. In the mask image, if Mask data of a specific pixel is 1, it is determined that a pixel at a corresponding position in the first image is a to-be-filled pixel. If Mask data of a specific pixel is 0, it is determined that a pixel at a corresponding position in the first image is not a to-be-filled pixel.

As another example, the first value is equal to 0 and the second value is equal to 1. In this case, the device has the following preset provisions. In the mask image, if Mask data of a specific pixel is 0, it is determined that a pixel at a corresponding position in the first image is a to-be-filled pixel. If Mask data of a specific pixel is 1, it is determined that a pixel at a corresponding position in the first image is not a to-be-filled pixel.

It may be understood that the first value and the second value may alternatively be represented by other values or characters. For example, the first value is identified by character A, the second value is identified by character B, and the like. A specific implementation of the first value and the second value is not limited in this embodiment of this application. This may be set according to an actual requirement. Details are not described herein.

As an example, if it is determined, based on Mask data at a sampled pixel, that a to-be-sampled pixel does not need to be performed with the pixel filling operation, rendered data at the corresponding position on the first image is retained. To be specific, after the mask data is read from the sampled pixel in the mask image, it is determined that the pixel at the corresponding position corresponding to the sampled pixel in the first image is not a to-be-filled pixel, so that the color data is no longer read from the internal memory and a process of writing to the first image is not performed.

It may be understood that because the mask image is a binary image and is a single-channel 8-bit mask image, when there is no need to perform the pixel filling operation on the sampled pixel, memory access overhead is only for an 8-bit read operation.

As another example, if it is determined, based on the Mask data of the sampled pixel, that the sampled pixel is a to-be-filled pixel, the pixel filling operation is performed on the pixel at the corresponding position in the first image. In other words, a logical process and algorithm of pixel filling are used to obtain the color data of the pixel and write the color data of the pixel to the position of the pixel in the first image.

S404: Read, for any one of the to-be-filled pixels in the first image, color data of the first real image frame from the internal memory, and use the color data to perform color filling on the to-be-filled pixel in the first image.

S405: Perform no processing on any effective pixel in the first image, and retain color data of the effective pixel.

In other words, in this embodiment of this application, color data of the effective pixels in the first image is retained.

S406: When it is determined that the pixels in the first image have color data, generate a predicted image frame displayed between the first real image frame and the second real image frame.

In this embodiment of this application, at a pixel filling stage of an image, the first image after being performed with pixel or pixel block movement may be used as a target rendered image. The first image is an image having a to-be-filled pixel region.

For example, when the to-be-filled pixel in the first image is determined, a target reference pixel of the to-be-filled pixel may be searched in the first image by moving, and then rendered data of the target reference pixel is determined by reading the internal memory. The color data of the first real image frame is stored in the internal memory. The pixel filling algorithm is performed by using RGBA four-channel data to calculate color data of the to-be-filled pixel, and a calculation result is written to the pixel at the corresponding position in the first image.

In this embodiment of this application, after the color filling is performed on all to-be-filled pixels in the first image based on rendered data of the first real image frame, a complete color image can be obtained, that is, the predicted image frame that can be interpolated between the first real image frame and the second real image frame for display, so that a frame rate of a displayed image can be increased and frame freezing in a picture is reduced.

It may be learned from the foregoing analysis that the predicted image frame is generated for frame interpolation display to improve a display frame rate of an image. In addition, during image rendering, the data filling is only performed on the to-be-filled pixels in the first image, and the effective pixels in the first image are retained. Intermediate data of the pixel filling algorithm is reused, to significantly reduce a quantity of memory accesses and data volume of a single memory access, effectively reduce power consumption of a device, and resolve a problem of device heating while ensuring integrity of a color of the predicted image frame.

Figure 7:
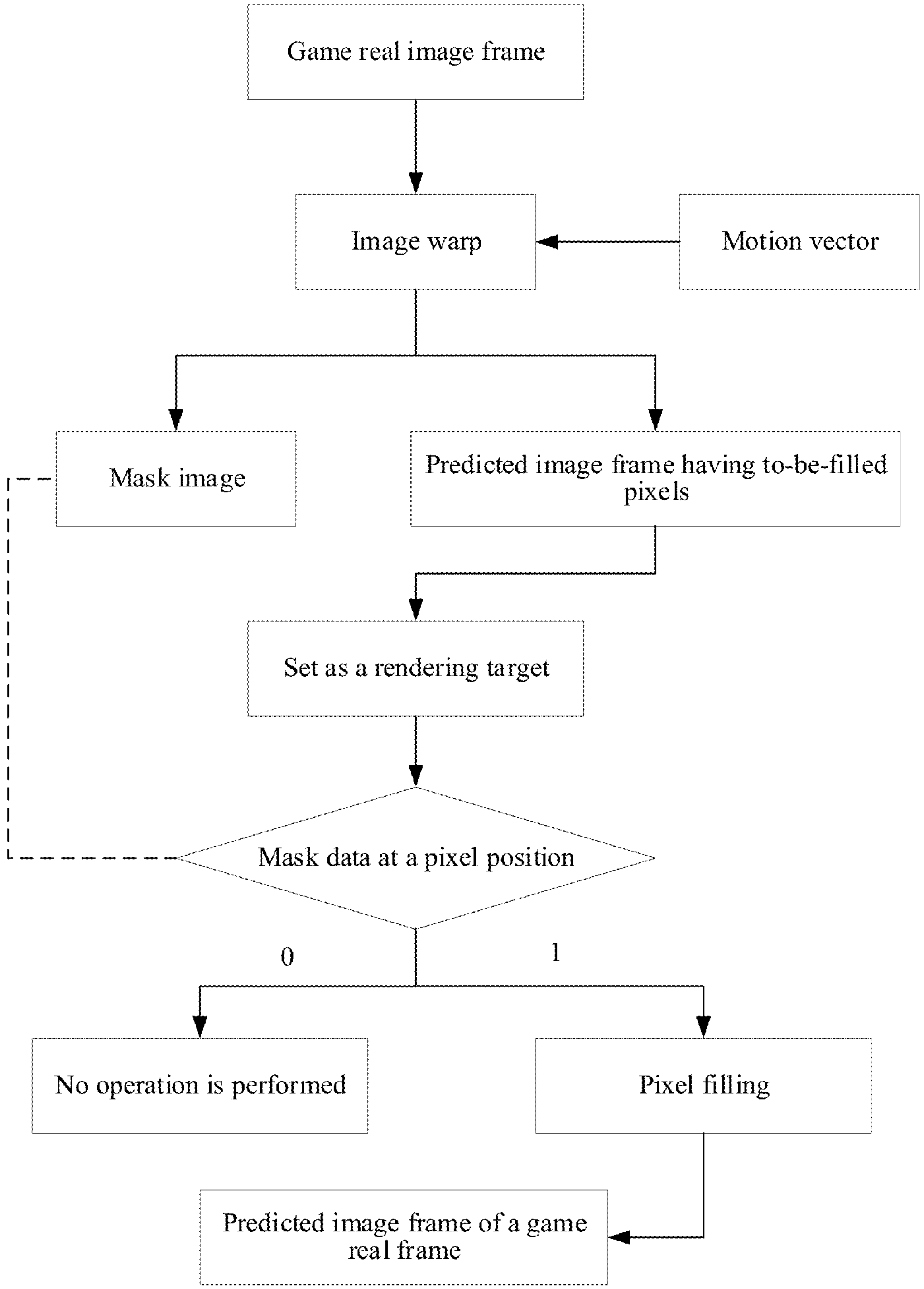
FIG. 7 is a block flowchart according to an embodiment of FIG. 6.

Based on the foregoing steps, FIG. 7 is a block flowchart according to the embodiment of FIG. 6. The block flowchart is described by generating a predicted image frame of a game real image frame. In this embodiment, the game real image frame is a first real image frame, and the predicted image frame is represented by a mask image. Mask data of a specific pixel in the mask image being equal to 0 indicates that a pixel at a corresponding position in the predicted image frame having to-be-filled pixels is not a to-be-filled pixel. Mask data of a specific pixel in the mask image being equal to 1 indicates that a pixel at a corresponding position in the predicted image frame having to-be-filled pixels is a to-be-filled pixel.

As shown in FIG. 7, for the game real image frame, an image warp operation may be performed on the game real image frame by using the motion vector to generate the mask image and the predicted image frame having to-be-filled pixels. Then, at a pixel filling stage, the predicted image frame having to-be-filled pixels is set as a rendering target. Next, based on mask data read at a pixel position in the mask image, a pixel region in the predicted image frame having to-be-filled pixels that needs to be performed with a pixel filling operation is determined. Finally, the pixel region that needs to be performed with the pixel filling operation is performed with data filling to obtain the predicted image frame of the game real image frame.

Optionally, if mask data of a specific pixel is equal to 0, no operation is performed on a pixel at a corresponding position in the predicted image frame having to-be-filled pixels, color data at the pixel is retained, and mask data of another pixel in the mask image is read. Further, it is determined whether another pixel in the predicted image frame having to-be-filled pixels is performed with the pixel filling operation.

Optionally; if mask data of a specific pixel is equal to 1, the pixel filling operation is performed on a pixel at a corresponding position in the predicted image frame having to-be-filled pixels, generated color data is wrote into the corresponding position of the predicted image frame having to-be-filled pixels, and then a value at another pixel position in the mask image is read to determine whether another pixel in the predicted image frame having to-be-filled pixels needs to be performed with the pixel filling operation, until to-be-filled pixels in the predicted image frame having to-be-filled pixels are all processed.

The following uses a specific example to compare a bandwidth usage of a predicted image frame generation solution provided in this application and a predicted image frame generation solution in the related art for description. It is assumed that a size of an image (a first real image frame, a first image, a mask image, and a predicted image frame of the first real image frame) processed in this application is 1584 (width)×720 (height), and a unit is a pixel. The first real image frame, the first image, and the predicted image frame include each 4-channel 8-bit RGBA data, a processing rate of a pixel filling operation is 60 (fps), and the mask image includes single-channel 8-bit data represented by 0 or 1.

Figure 8:
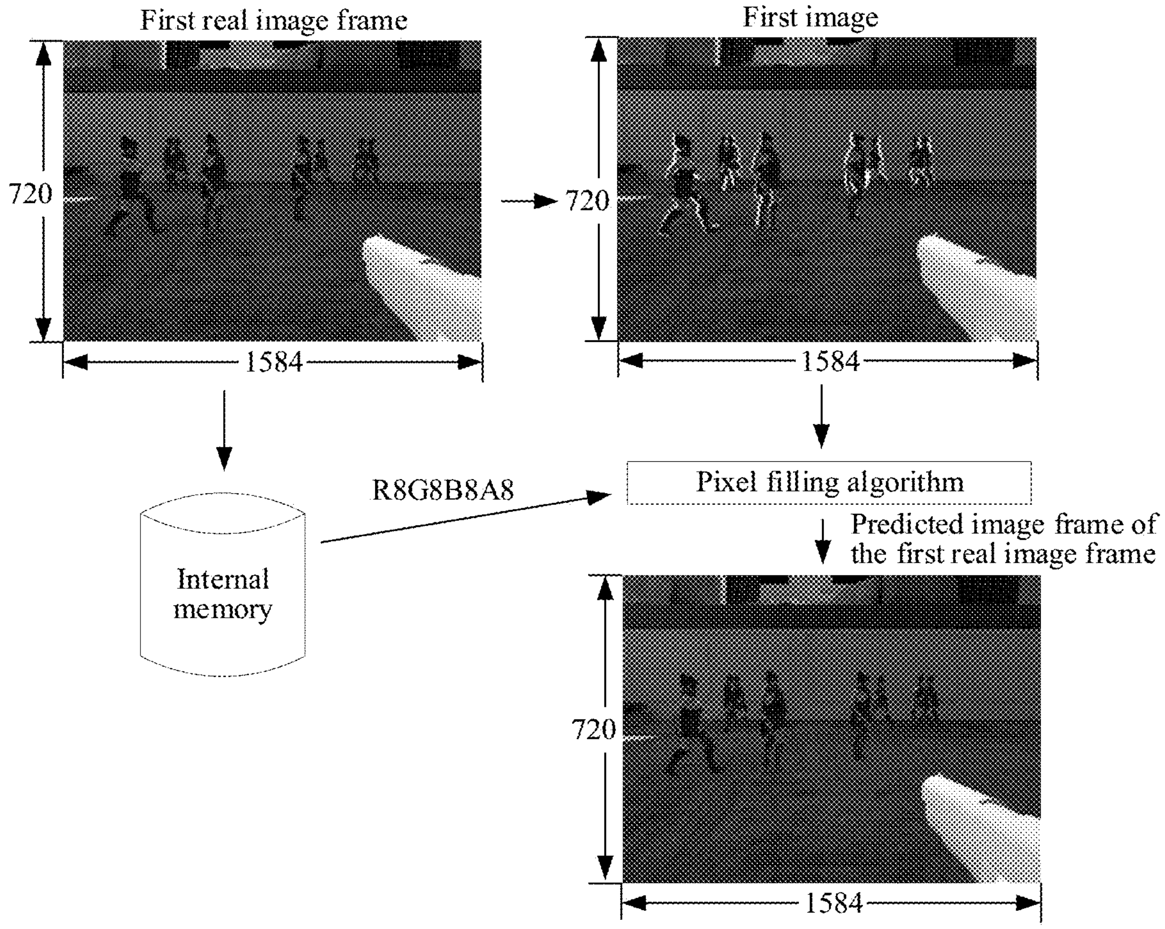
FIG. 8 is a schematic diagram of an implementation of a predicted image frame generation solution in the related art.

For example, FIG. 8 is a schematic diagram of an implementation of a predicted image frame generation solution in the related art. As shown in FIG. 8, a first real image frame is a real image frame, rendered data of pixels are stored in an internal memory, and the rendered data includes color data. In this way, when a first image (a predicted image frame having to-be-filled pixels) is generated based on the first real image frame, and the first image needs to be performed with pixel filling, color data of the pixels is sequentially read from the internal memory and then rendered into the first image. In other words, a read operation and a write operation need to be performed separately to obtain a predicted image frame of the first real image frame.

In an example shown in FIG. 8, when the pixel filling is performed on the first image, a needed transmission bandwidth is 1584 (width)×720 (height)×4 (RGBA8)×60 (fps)×2 (read+write)=547430400 B/s=522 M/s. 1 M/s=1024 KB=$1024^2$ B/s.

Figure 9:
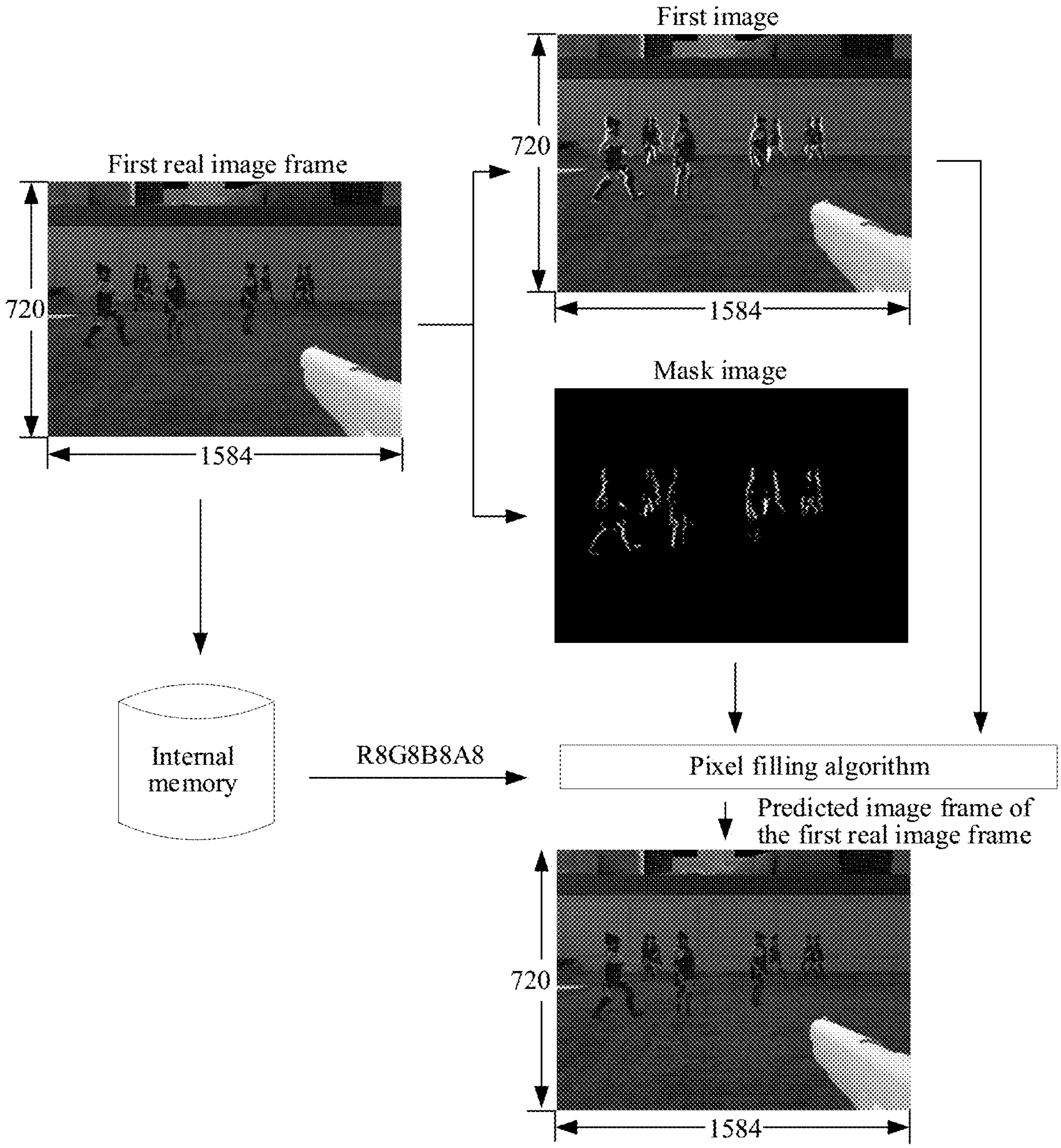
FIG. 9 is a schematic diagram of an implementation of a predicted image frame generation solution according to an embodiment of this application.

For example, FIG. 9) is a schematic diagram of an implementation of a predicted image frame generation solution according to an embodiment of this application. As shown in FIG. 9, a first real image frame is a real image frame, rendered data of pixels are stored in an internal memory, and the rendered data includes color data. In this way, when pixel filling is performed on a first image based on a mask image (which is used for marking a to-be-filled pixel region in the first image) of the first image, mask values of pixels in the mask image are first read to determine whether it is necessary to perform a pixel filling operation on a pixel at a corresponding position in the first image.

As an example, if there is no need to perform the pixel filling operation on the pixel at the corresponding position, a pixel shading operation at the corresponding position is canceled, and an operation of writing data to a rendering target is not performed. In other words, only a read operation needs to be performed on 8-bit Mask data once, instead of a read operation and a write operation on 32-bit image data once. This reduces data volume of a memory assess.

As another example, if it is necessary to perform the pixel filling operation on the pixel at the corresponding position, the color data of the first real image frame is read from the internal memory based on a pixel filling method, and color data of the pixel is calculated and rendered to the pixel position in the first image to obtain a predicted image frame of the first real image frame. In other words, for this part, the read operation needs to be performed on the 8-bit Mask data once, and then the read operation and the write operation are performed on the 32-bit image data once.

Optionally, in actual application, to increase a frame rate and image reality, displacement between a real image frame and a predicted image frame is generally small. For example, in the first image, it is assumed that an area ratio of a to-be-filled pixel region to the first image is equal to 1%. Therefore, in this embodiment, when the filling pixel is performed on the first image, a needed transmission bandwidth is 1584 (width)×720 (height)×4 (RGBA8)×60 (fps)×0.01 (the area ratio of the to-be-filled pixel region)×2 (read+write)+1584 (width)×720 (height)×60 (fps)×1 (for pixels in the mask image, the read operation needs to be performed on the 8-bit Mask data once)=73903104 B/s=70 M/s.

It may be learned from the foregoing analysis that in this embodiment of this application, when a frame interpolation condition is satisfied between the first real image frame and the second real image frame, the obtained first real image frame is processed to obtain a first image and a mask image of the first image. The mask image is used for marking to-be-filled pixels and effective pixels in the first image. Mask data of the mask image is sampled pixel by pixel to determine whether pixels in the first image are to-be-filled pixels. Finally, for any one of the to-be-filled pixels in the first image, color data of the first real image frame from an internal memory, and the color data is used to perform color filling on the to-be-filled pixel in the first image, to generate a predicted image frame that can be interpolated between the first real image frame and the second real image frame for display. The effective pixels in the first image are not processed, and color data of the effective pixels is retained. In this technical solution, the mask image is a single-channel 8-bit mask image. Therefore, for the pixels that do not need to be filled in the first image, only a read operation needs to be performed on the 8-bit Mask data once, instead of a read operation and a write operation on 32-bit image data once. This reduces data volume of a memory access.

Figure 10:
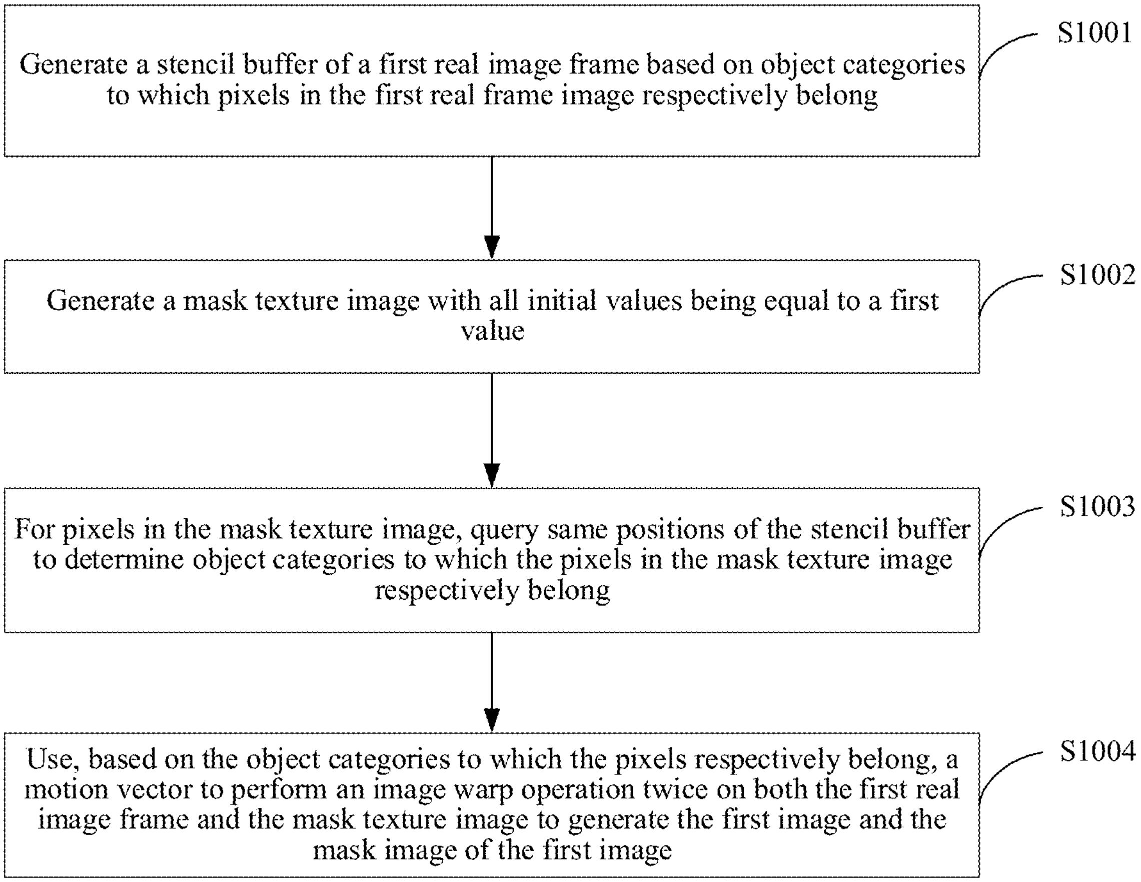
FIG. 10 is a schematic flowchart of embodiment 2 of a data processing method according to an embodiment of this application.

For example, based on the foregoing embodiments, FIG. 10 is a schematic flowchart of embodiment 2 of a data processing method according to an embodiment of this application. As shown in FIG. 10, S402 may be implemented through the following steps.

S1001: Generate a stencil buffer of the first real image frame based on the object categories to which the pixels in the first real image frame respectively belong.

In the stencil buffer, a stencil value of a pixel corresponding to a dynamic object is equal to an identifier (a positive integer) of the dynamic object, and a stencil value of a pixel corresponding to a static object is equal to 0. It may be understood that the stencil buffer is alternatively an image, and the dynamic object in the first real image frame is marked with a positive integer, and pixels in the static object in the first real image frame are marked with a value of 0.

In this embodiment, during normal image rendering, stencil values of the pixels when being filled may be set based on whether objects to which the pixels in the first real image frame respectively belong are dynamic objects or static objects.

In an optional embodiment, if an object to which a specific pixel in the first real image frame belongs is a dynamic object, it is determined that the stencil value of the pixel is an identifier (ID) of the object to which the pixel belongs, and the stencil value of the pixel is outputted to the stencil buffer. If an object to which a specific pixel in the first real image frame belongs is a static object, it is determined that the stencil value of the pixel is 0, and 0 is outputted to the stencil buffer.

S1002: Generate a mask texture image with all initial values being equal to a first value.

The first value is used for marking the to-be-filled pixels in the first image.

Optionally, in actual application, a mask texture image may be first created. In addition, values of pixels in the mask texture image are all initialized to be equal to the first value. For example, the first value is equal to 1.

S1003: For the pixels in the mask texture image, query same positions of the stencil buffer to determine object categories to which the pixels in the mask texture image respectively belong.

During generating the first image and the mask image, for each pixel in the mask texture image, the stencil buffer of the first real image frame is first queried based on a pixel position of the pixel, and data at a same pixel position is read to obtain an object category to which the pixel belongs, in other words, whether the pixel is a pixel of a dynamic object or a pixel of a static object.

S1004: Use, based on the object categories to which the pixels respectively belong, a motion vector to perform an image warp operation twice on both the first real image frame and the mask texture image to generate the first image and the mask image of the first image.

In this embodiment of this application, for a static item in the first real image frame, a first image warp (image warp) operation is performed on the first real image frame and the mask texture image, and during the image warp operation, it is determined whether a current pixel is a static pixel. If it is determined that the current pixel is a static pixel, 0 is outputted to the mask texture image. If it is determined that the current pixel is not a static pixel, no operation is performed. In other words, data of a corresponding pixel position in a corresponding mask texture image is kept as 1. Correspondingly, a warped first real image frame and a warped mask texture image are generated.

Optionally; for a dynamic item in the warped first real image frame, a second image warp operation is performed on the warped first real image frame and the warped mask texture image, and during the image warp operation, it is determined whether a current pixel is a dynamic pixel. If it is determined that the current pixel is a dynamic pixel, 0 is outputted to the warped mask texture image. Otherwise, no operation is performed. In this case, pixel data of the mask texture image after two warp operations are kept as 1.

Correspondingly, the first real image frame is performed with two warp operations to generate the first image. Correspondingly, the mask texture image is also performed with two image warp operations to generate the mask image of the first image.

Because pixels in the to-be-filled pixel region belong to neither dynamic objects nor static objects, no operation is performed on the pixels in the mask texture image, the data of 1 is retained, and 0 is outputted in another position, so that the mask image of the first image is generated.

In this embodiment of this application, the stencil buffer of the first real image frame is generated based on the object categories to which the pixels in the first real image frame respectively belong, so that the object categories to which the pixels in the mask texture image of which the initial values are all equal to the first value respectively belong may be determined based on the stencil buffer. Further, based on the object categories to which the pixels respectively belong, the motion vector is used to perform the image warp operation twice on both the first real image frame and the mask texture image to generate the first image and the mask image of the first image. In this technical solution, a specific method of generating a mask image is provided. This lays a foundation for reducing a quantity of memory accesses and volume of memory accesses in the subsequent predicted image frame generation process.

Figure 11:
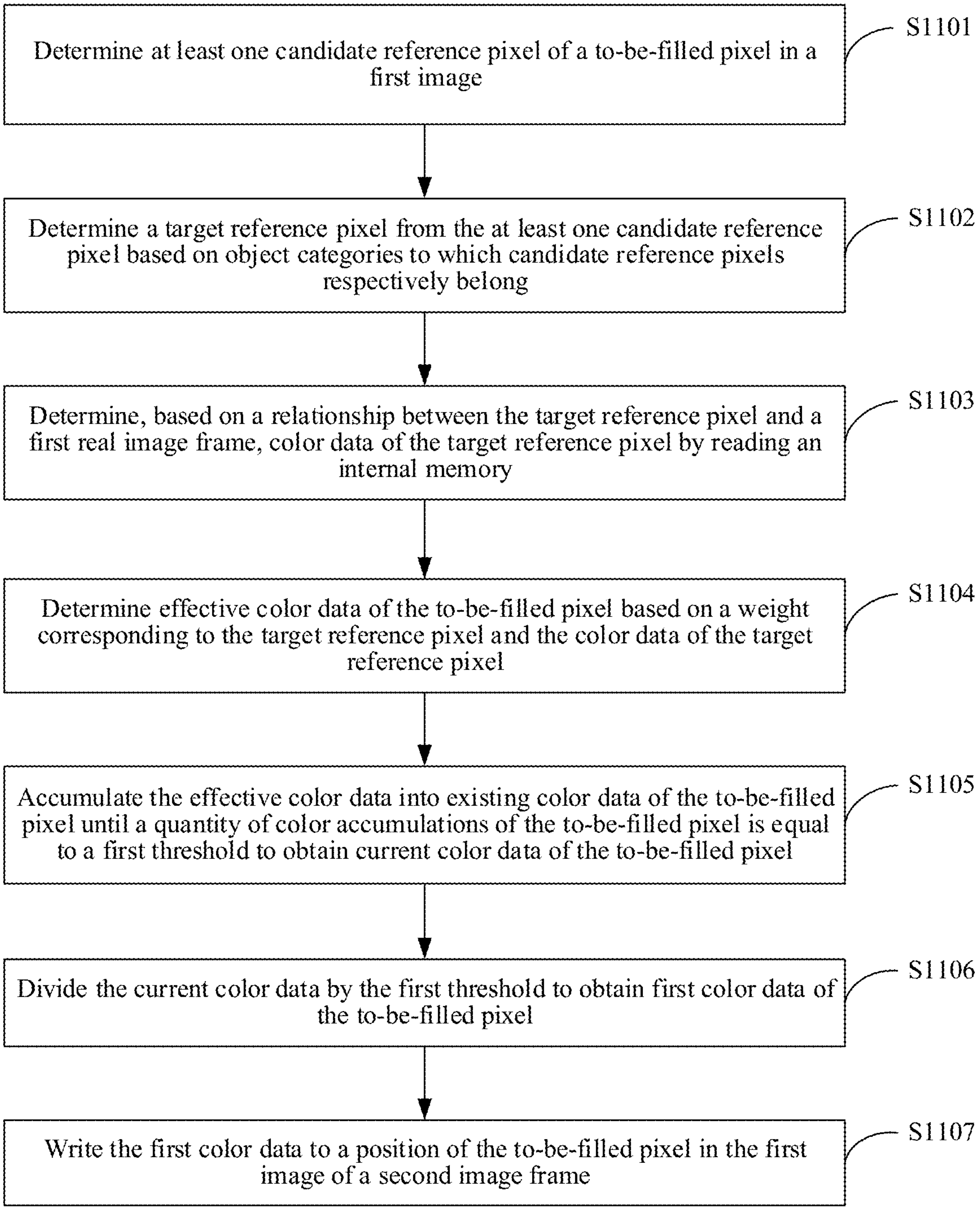
FIG. 11 is a schematic flowchart of embodiment 3 of a data processing method according to an embodiment of this application.

For example, based on the foregoing embodiments, FIG. 11 is a schematic flowchart of embodiment 3 of a data processing method according to an embodiment of this application. As shown in FIG. 11, S404 may be implemented through the following steps.

S1101: Determine at least one candidate reference pixel of the to-be-filled pixel in the first image.

In this embodiment, for the to-be-filled pixel in the first image, a position is randomly moved to a first position in the first image with a position of the to-be-filled pixel as a starting point. Then, it is determined whether the first position belongs to a to-be-filled pixel region. If the first position does not belong to the to-be-filled pixel region, it is determined that a pixel at the first position is a candidate reference pixel of the to-be-filled pixel. If the first position belongs to the to-be-filled pixel region, the position is continued to randomly move in the first image with the first position as a starting point until moving to a second position that does not belong to the to-be-filled pixel region, and the second position is determined as the candidate reference pixel of the to-be-filled pixel. Similarly, another candidate reference pixel may be determined in the manner.

Figure 12:
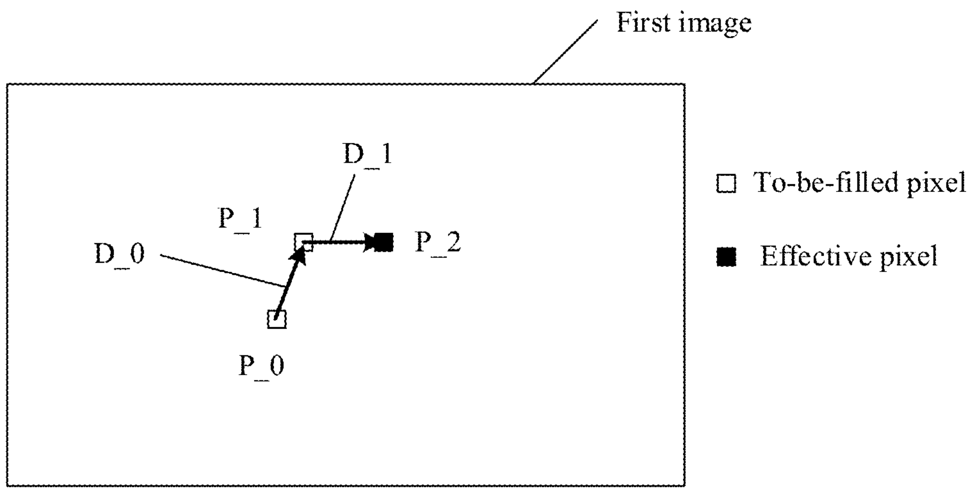
FIG. 12 is a schematic diagram of a process of determining a candidate reference pixel.

For F example, FIG. 12 is a schematic diagram of a process of determining a candidate reference pixel. As shown in FIG. 12, it is assumed that a coordinate point of the to-be-filled pixel is a starting point P_0, a position is randomly moved a step Offset_0) (O_0) in a direction D_0 to a first position P_i with the coordinate point of the to-be-filled pixel as the starting point P_0, and then it is determined whether the first position P_i is located in the to-be-filled pixel region. If the first position P_i is located in the to-be-filled pixel region, for example, if a P_I moved to is still located in the to-be-filled pixel region, the position is continued to randomly move in a direction, for example, D_1, until moving to a position that is not in the to-be-filled pixel region, that is, an effective pixel position, for example, P_2. A pixel at the position P_2 is the candidate reference pixel of the to-be-filled pixel. In addition, the position coordinate P_2 and the moving direction D_1 of the candidate reference pixel are marked.

S1102: Determine a target reference pixel from the at least one candidate reference pixel based on object categories to which candidate reference pixels respectively belong.

In this embodiment, for any one of the foregoing at least one candidate reference pixel, a semantic graph corresponding to a position may be sampled based on the position of the candidate reference pixel, and then it is determined whether the candidate reference pixel is a pixel of a set object category: If it is determined that the candidate reference pixel is the pixel of the set object category, the candidate reference pixel is determined as the target reference pixel. If it is determined that the candidate reference pixel is not the pixel of the set object category, the candidate reference pixel is discarded.

The semantic graph is an internal memory region which is referred to as a depth stencil buffer set during graphics rendering. The depth stencil buffer has two channels. One channel is used for storing a depth of a scene, and the other channel is referred to as a stencil which is a position where semantics are stored. When a rendering instruction is called, for each object in the image, if shaping data is transmitted in an instruction glStencilFunc( ), the shaping data is written to the depth stencil buffer, that is, a stencil channel of a pixel block covered by the object. In this way, stencil data is used as the semantic graph.

In an optional implementation, because the to-be-filled pixel region is a blank pixel that appears after image displacement, the to-be-filled pixel region is a region belonging to a static object in actual application. Therefore, in this embodiment, the set object category is the static object. Correspondingly, it may be determined whether candidate reference pixels each are a pixel of the static object. If a specific candidate reference pixel is a pixel of the static object, it is determined that the candidate reference pixel is the target reference pixel. If a specific candidate reference pixel is not a pixel of the static object, in other words, if the candidate reference pixel is a pixel of a dynamic object, the candidate reference pixel is discarded.

Optionally, in actual application, if a reference pixel of the static object that satisfies a requirement cannot be found after step S1101 is iteratively processed a plurality of times, a candidate reference pixel of the dynamic object may also be selected as the target reference pixel. It may be understood that because motion patterns of the dynamic object and the static object are different, when frame prediction is processed, the dynamic object and the static object need to be processed separately. Details are not described herein.

S1103: Determine, based on a relationship between the target reference pixel and the first real image frame, color data of the target reference pixel by reading the internal memory.

The color data of the first real image frame is stored in the internal memory.

Optionally, in this embodiment, after being generated, the rendered data of the real image frame is to be stored in the internal memory for subsequent use. Therefore, the color data of the first real image frame is stored in the internal memory. Therefore, when the candidate reference pixel is determined as the target reference pixel, the internal memory may be queried based on a position of the target reference pixel in the first image, and the color data of the target reference pixel may be determined from the rendered data of the first real image frame.

S1104: Determine effective color data of the to-be-filled pixel based on a weight corresponding to the target reference pixel and the color data of the target reference pixel.

Optionally, in this embodiment, the weight corresponding to the target reference pixel may be determined based on a positional relationship between the target reference pixel and the to-be-filled pixel, and then the color data of the target reference pixel and the weight corresponding to the target reference pixel are summed to determine the effective color data of the target reference pixel.

S1105: Accumulate the effective color data into existing color data of the to-be-filled pixel until a quantity of color accumulations of the to-be-filled pixel is equal to a first threshold to obtain current color data of the to-be-filled pixel.

S1106: Divide the current color data by the first threshold to obtain first color data of the to-be-filled pixel.

Optionally, after the effective color data of the target reference pixel is calculated, the effective color data of the target reference pixel may be accumulated into the existing color data of the to-be-filled pixel, a set displacement is moved in a direction of a first probability with a position of a position coordinate P_i of the target reference pixel as a starting point to find another target pixel (which is also referred to as a target reference pixel) belonging to a set object category, and color data of the another target pixel is accumulated into the existing color data.

Moving the set displacement in the direction of the first probability may be moving Offset_i in a direction of D_i or moving Offset_i in a random direction D_j. This is not limited in this embodiment. However, a probability of moving Offset_i in the direction of D_i is higher than a probability of moving Offset_i in the random direction of D_j.

Optionally, processes from S1101 to S1105 is repeatedly performed a set quantity t of times, in other words, until the quantity of color accumulations of the to-be-filled pixel is equal to the first threshold, to obtain the current color data of the to-be-filled pixel. The current color data is divided by the quantity t of accumulations to obtain the first color data of the to-be-filled pixel.

For example, in this embodiment, the pixel of the static object is used as the target reference pixel. When the color data of the to-be-filled pixel is calculated, the color data of the target reference pixel and the weight corresponding to the target reference pixel may be accumulated into the existing color data of to-be-filled pixel. Then, a position is moved in the direction of the first probability with the position of the position coordinate P_i of the target reference pixel as a starting point to find the pixel belonging to the static object, and pixel data of the static object is accumulated into the existing color data.

It may be understood that weight data of the target reference pixel is fixed, and is equal to a fixed value generated by mathematical calculation. An example in which the pixel of the static object is the target reference pixel is used. A weight corresponding to the target reference pixel is to take data in this array based on a quantity of steps of P_0 movement.

For example, the following uses an example of weight distribution corresponding to the static object for description. If a sampling position of the target reference pixel is moved by one step compared with a starting position, the weight corresponding to the target reference pixel is 1.898840. If the sampling position of the target reference pixel is moved by 10 steps compared with the starting position, the corresponding weight is 0.144245.

The weight distribution corresponding to the static object is as follows:

```
const highp float Distance_Inv[128] = float[128]
(
  1.898840, 1.824470, 1.104720, 0.296970, 0.219880, 0.197224, 0.179284,
0.154482, 0.147665, 0.144245, 0.067793, 0.054142, 0.050809, 0.045755, 0.035451, 0.030171,
0.030158, 0.029904, 0.025308, 0.024105, 0.022307, 0.021846, 0.020519, 0.020473, 0.020024,
0.018623, 0.015612, 0.014383, 0.013974, 0.013166, 0.012510, 0.007830, 0.007438, 0.007360,
0.007279, 0.007151, 0.007144, 0.006906, 0.006578, 0.006517, 0.006394, 0.006342, 0.006172,
0.005755, 0.005722, 0.005310, 0.004307, 0.004235, 0.004145, 0.004093, 0.003782, 0.003714,
0.003468, 0.003244, 0.003197, 0.003029, 0.002935, 0.002846, 0.002817, 0.002719, 0.002698,
0.002652, 0.002646, 0.002585, 0.002569, 0.002503, 0.002254, 0.002125, 0.002078, 0.002053,
0.001956, 0.001880, 0.001837, 0.001764, 0.001710, 0.001572, 0.001550, 0.001550, 0.001535,
0.001511, 0.001496, 0.001491, 0.001481, 0.001449, 0.001378, 0.001371, 0.001361, 0.001341,
0.001328, 0.001323, 0.001119, 0.001086, 0.001064, 0.001058, 0.001038, 0.000988, 0.000983,
0.000974, 0.000959, 0.000956, 0.000956, 0.000926, 0.000901, 0.000869, 0.000864, 0.000862,
0.000858, 0.000806, 0.000806, 0.000789, 0.000784, 0.000783, 0.000780, 0.000778, 0.000772,
0.000766, 0.000736, 0.000714, 0.000708, 0.000695, 0.000687, 0.000684, 0.000682, 0.000678,
0.000670, 0.000668, 0.000667, 0.000666
 ).
```

It may be understood that a specific value in the weight distribution is not limited in this embodiment of this application, and may be selected according to an actual scenario. Details are not described herein.

Optionally, compared with the weight distribution of the static object, weight of a corresponding position in weight distribution of a dynamic object is generally small. A specific value may be determined according to an actual situation. This is not limited herein.

S1107: Write the first color data to a position of the to-be-filled pixel in the first image.

In the step, after the color data of the to-be-filled pixel is determined, the color data of the to-be-filled pixel may be written to original data where the rendering target covers a pixel at a position corresponding to the rendering target, that is, to the position of the to-be-filled pixel. After the to-be-filled pixels in the first image are filled with the color data, the predicted image frame of the first real image frame may be generated.

In this embodiment of this application, the at least one candidate reference pixel of the to-be-filled pixel is determined in the first image. The target reference pixel in the at least one candidate reference pixel is determined based on the object categories to which the candidate reference pixels respectively belong. Then, the internal memory is read to determine the color data of the target reference pixel. The internal memory stores the rendered data of the first real image frame. The effective color data of the to-be-filled pixel is determined based on the weight corresponding to the target reference pixel and the color data of the target reference pixel. The effective color data is accumulated into the existing color data of the to-be-filled pixel until the quantity of color accumulations of the to-be-filled pixel is equal to the first threshold to obtain the current color data of the to-be-filled pixel. Finally, the current color data is divided by the first threshold to obtain the first color data of the to-be-filled pixel, and the first color data is written to the position of the to-be-filled pixel in the first image. In this technical solution, the color data of the target reference pixel is read from the internal memory and intermediate data of a pixel filling algorithm is reused, to significantly reduce a quantity of memory accesses and data volume of a single memory access and effectively reduce power consumption of a device while ensuring integrity of a color of the predicted image frame.

The foregoing mainly describes solutions according to embodiments of this application from a method perspective. To implement the foregoing functions, corresponding hardware structures and/or software modules for performing the functions are included. A person skilled in the art needs to be easily aware that the method steps in the examples described with reference to embodiments disclosed in this specification may be implemented in this application in a form of hardware or a combination of hardware and computer software. Whether a function is performed by hardware or computer software driving hardware depends on particular applications and design constraint conditions of the technical solutions. A person skilled in the art may use different methods to implement the described functions for each particular application, but it should not be considered that the implementation goes beyond the scope of this application.

In embodiments of this application, an apparatus for implementing a data processing method may be divided into functional modules based on the foregoing method examples, for example, each functional module may be obtained through division for each corresponding function, or two or more functions may be integrated into one processing module. The integrated module may be implemented in a form of hardware, or may be implemented in a form of a software functional module. It should be noted that in embodiments of this application, the module division is an example, and is merely logical function division, and there may be other division manners during actual implementation.

Figure 13:
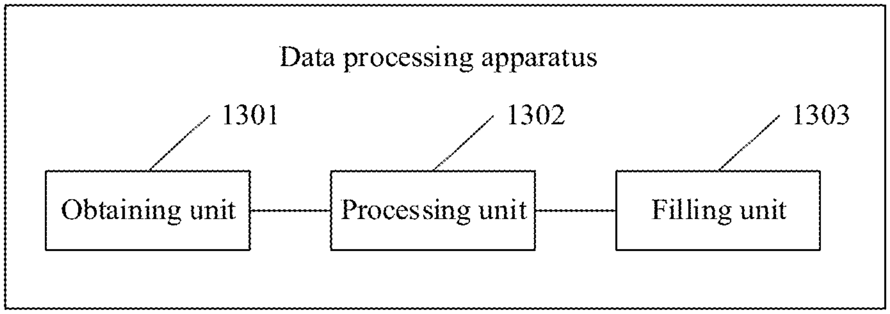
FIG. 13 is a schematic diagram of a structure of a data processing apparatus according to an embodiment of this application.

For example, FIG. 13 is a schematic diagram of a structure of a data processing apparatus according to an embodiment of this application. The data processing apparatus may be implemented by a graphics processing unit GPU in an electronic device. As shown in FIG. 13, the data processing apparatus includes:

an obtaining unit 1301, configured to obtain a first real image frame and a second real image frame;

a processing unit 1302, configured to process, when a frame interpolation condition is satisfied between the first real image frame and the second real image frame, the first real image frame to obtain a first image and a mask image of the first image, where the mask image is used for marking to-be-filled pixels and effective pixels in the first image, where the processing unit 1302 is further configured to sample mask data of the mask image pixel by pixel to determine whether pixels in the first image are to-be-filled pixels; and a filling unit 1303, configured to read, for any one of the to-be-filled pixels in the first image, color data of the first real image frame from an internal memory; and use the color data to perform color filling on the to-be-filled pixel in the first image, to generate a predicted image frame displayed between the first real image frame and the second real image frame, where color data of the effective pixels in the first image is retained.

In a possible implementation in this embodiment of this application, the frame interpolation condition includes that a moving distance between two consecutive real image frames is less than a distance threshold and there is no translucent object in a real image frame.

Optionally, after the obtaining unit 1301 obtains the first real image frame and the second real image frame, the processing unit 1302 is further configured to perform the following operations:

determining whether there is a translucent object in the first real image frame;

calculating a first moving distance between the first real image frame and the second real image frame in response to that there is no translucent object in the first real image frame;

determining whether the first moving distance is less than the distance threshold;

determining, in response to that the first moving distance is less than the distance threshold, that the frame interpolation condition is satisfied between the first real image frame and the second real image frame; and determining, in response to that there is a translucent object in the first real image frame and/or the first moving distance is greater than or equal to the distance threshold, that the frame interpolation condition is not satisfied between the first real image frame and the second real image frame.

In a possible implementation in this embodiment of this application, when the color data of the first real image frame is read from the internal memory, and the color data is used to perform the color filling on the to-be-filled pixel in the first image, the filling unit 1303 is specifically configured to:

determine at least one candidate reference pixel of the to-be-filled pixel in the first image;

determine a target reference pixel from the at least one candidate reference pixel based on object categories to which candidate reference pixels respectively belong;

determine, based on a relationship between the target reference pixel and the first real image frame, color data of the target reference pixel by reading the internal memory; and perform the color filling on the to-be-filled pixel based on the color data of the target reference pixel.

Optionally, when the candidate reference pixel of the to-be-filled pixel is determined in the first image, the filling unit 1303 is specifically configured to:

randomly move to a first position in the first image with a position of the to-be-filled pixel as a starting point;

determine, if a pixel at the first position is not a to-be-filled pixel, that the pixel at the first position is the candidate reference pixel of the to-be-filled pixel; and if the pixel at the first position is a to-be-filled pixel, continue to randomly move in the first image with the first position as the starting point until moving to a second location where a pixel is not a to-be-filled pixel, and determining the pixel at the second position as the candidate reference pixel of the to-be-filled pixel.

Optionally, when the color filling is performed on the to-be-filled pixel based on the color data of the target reference pixel, the filling unit 1303 is specifically configured to:

determine effective color data of the target reference pixel based on a weight corresponding to the target reference pixel and the color data of the target reference pixel;

accumulate the effective color data into existing color data of the to-be-filled pixel until a quantity of color accumulations of the to-be-filled pixel is equal to a first threshold to obtain current color data of the to-be-filled pixel;

divide the current color data by the first threshold to obtain first color data of the to-be-filled pixel; and write the first color data to a position of the to-be-filled pixel in the first image.

In a possible implementation in this embodiment of this application, when the first real image frame is processed to obtain the first image and the mask image of the first image, the processing unit 1302 is specifically configured to:

use, based on object categories to which pixels in the first real image frame respectively belong, a motion vector to perform an image warp operation twice on the first real image frame to generate the first image; and generate the mask image of the first image based on whether color data exists for the pixels in the first image.

In a possible implementation in this embodiment of this application, when the first real image frame is processed to obtain the first image and the mask image of the first image, the processing unit 1302 is specifically configured to:

generate a stencil buffer of the first real image frame based on the object categories to which the pixels in the first real image frame respectively belong;

query the stencil buffer, and determine object categories to which pixels in a mask texture image respectively belong, where the mask texture image is an image of which initial values are all equal to a first value, and the first value is used for marking the to-be-filled pixels in the first image; and use, based on the object categories to which the pixels respectively belong, a motion vector to perform an image warp operation twice on both the first real image frame and the mask texture image to generate the first image and the mask image of the first image.

Optionally, when, a motion vector is used based on the object categories to which the pixels respectively belong to perform the image warp operation twice on both the first real image frame and the mask texture image to generate the first image and the mask image of the first image, the processing unit 1302 is specifically configured to:

use a multiple render targets MRT technology to perform a first image warp operation corresponding to the motion vector simultaneously on pixels in the first real image frame belonging to a first object category and pixels in the mask texture image belonging to the first object category to generate a warped first real image frame and a warped mask texture image; and perform a second image warp operation corresponding to the motion vector simultaneously on pixels in the warped first real image frame belonging to a second object category and pixels in the warped mask texture image belonging to the second object category to generate the first image and the mask image of the first image, where the first object category is a static object, and the second object category is a dynamic object, or the first object category is a dynamic object, and the second object category is a static object.

In a possible implementation in this embodiment of this application, when the mask data of the mask image is sampled pixel by pixel to determine whether the pixels in the first image are the to-be-filled pixels, the processing unit 1302 is specifically configured to:

sample mask data of pixels in the mask image pixel by pixel;

determine, if the mask data of the sampled pixels is equal to the first value in the mask image, that a pixel at a corresponding position in the first image is a to-be-filled pixel; and determine, if the mask data of the sampled pixels is equal to a second value, that the pixel at the corresponding position in the first image is not a to-be-filled pixel.

Optionally, the mask image is a binary image, the first value is equal to 1, and the second value is equal to 0.

The data processing apparatus provided in this embodiment of this application may be configured to perform the data processing method shown in FIG. 4. For an implementation principle and an effective effect, refer to the descriptions in the foregoing embodiment. Details are not described herein.

Figure 14:
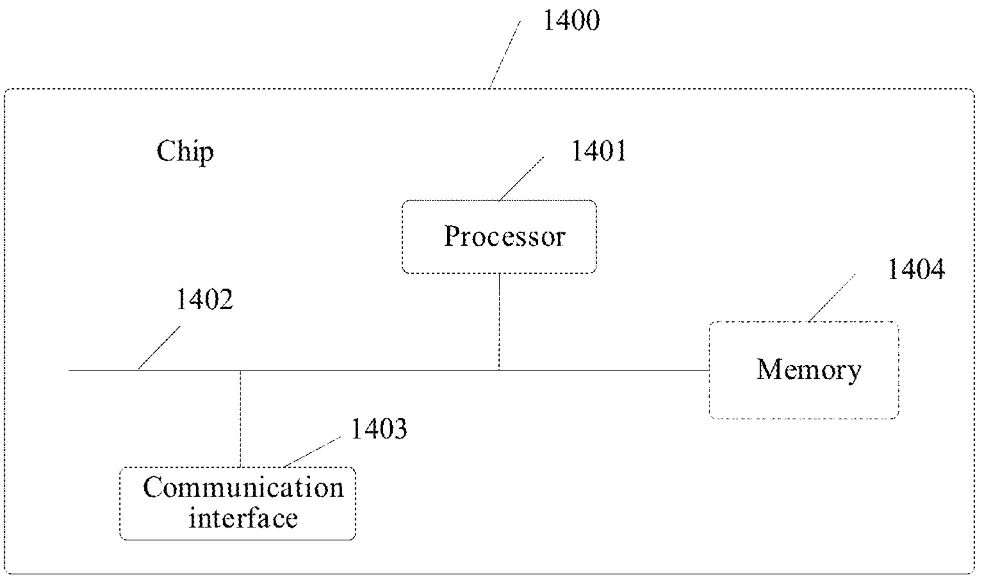
FIG. 14 is a schematic diagram of a structure of a chip according to an embodiment of this application.

For example, FIG. 14 is a schematic diagram of a structure of a chip according to an embodiment of this application. As shown in FIG. 14, a chip 1400 includes one or at least two (including two) processors 1401, a communication line 1402, a communication interface 1403, and a memory 1404.

The processor 1401 is implemented by a GPU, or the processor 1401 is implemented by a CPU and a GPU.

In some implementations, a memory 1404 stores the following elements: an executable module or a data structure, or subsets thereof, or extended sets thereof.

The method described in embodiments of this application may be applied to the processor 1401 or implemented by the processor 1401. The processor 1401 may be an integrated circuit chip having a capability of processing a signal. In an implementation process, steps in the foregoing methods can be implemented by using a hardware integrated logical circuit in the processor 1401, or by using instructions in a form of software. The processor 1401 may implement or execute various methods, steps, and logic block diagrams related to processing disclosed in this embodiment of this application.

The steps of the methods disclosed with reference to embodiments of this application may be directly performed and completed by using a hardware decoding processor, or may be performed and completed by using a combination of hardware and software modules in the decoding processor. The software module may be located in a mature storage medium in the field such as a random access memory, a read-only memory, a programmable read-only memory, or an electrically erasable programmable memory (electrically erasable programmable read only memory; EEPROM). The storage medium is located in the memory 1404, and the processor 1401 reads information in the memory 1404, and completes the steps in the foregoing methods in combination with hardware thereof.

The processor 1401, the memory 1404, and the communication interface 1403 may communicate with each other via the communication line 1402.

In the foregoing embodiment, the instructions executed by the processor stored in the memory may be implemented in the form of a computer program product. The computer program product may be pre-written in the memory, or may be downloaded and installed in the memory in the form of software.

Embodiments of this application further provides a computer program product, including one or more computer instructions. When the computer program instructions are loaded and executed on the computer, the procedure or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, including one or more usable media. For example, the usable medium may include a magnetic medium (for example, a floppy disk, a hard disk, or a magnetic tape), an optical medium (for example, a digital versatile disc (digital versatile disc, DVD)), a semi-conductive medium (for example, a solid-state disk (solid-state disk, SSD)), or the like.

An embodiment of this application further provides a computer-readable storage medium. All or some of methods in the foregoing embodiments may be implemented by using software, hardware, firmware, or any combination thereof. If implemented in software, the functions may be stored on or transmitted over as one or more instructions or code on a computer-readable medium or a computer-readable medium. The computer-readable medium may include a computer storage medium and a communication medium, and may further include any medium that can transmit a computer program from one place to another. The storage medium may be any target medium accessible by a computer.

In a possible implementation, the computer-readable medium may include a RAM, a ROM, a compact disc read-only memory (compact disc read-only memory, CD-ROM) or another optical disk memory, a magnetic disk memory or another magnetic storage device, or any other medium that is to carry or store required program code in a form of an instruction or a data structure, and may be accessed by a computer. In addition, any connection is appropriately referred to as a computer-readable medium. For example, if software is transmitted from a website, a server, or another remote source by using a coaxial cable, an optical fiber cable, a twisted pair, a digital subscriber line (Digital Subscriber Line, DSL), or wireless technologies (such as infrared ray, radio, and microwave), the coaxial cable, optical fiber cable, twisted pair, DSL, or wireless technologies such as infrared ray, radio, and microwave are included in the definition of the medium. A magnetic disk and an optical disc used herein include an optical disc, a laser disc, an optical disc, a digital versatile disc (Digital Versatile Disc, DVD), a floppy disk, and a blue ray disc, where the magnetic disk generally reproduces data in a magnetic manner, and the optical disc reproduces data optically by using laser. The foregoing combination should also be included in the scope of the computer-readable medium.

Embodiments of this application are described with reference to the flowcharts and/or block diagrams of the method, the device (system), and the computer program product according to embodiments of this application. It should be understood that computer program instructions can implement each procedure and/or block in the flowcharts and/or block diagrams and a combination of procedures and/or blocks in the flowcharts and/or block diagrams. These computer program instructions may be provided for a general-purpose computer, a dedicated computer, an embedded processor, or a processing unit of any other programmable data processing device to generate a machine, so that the instructions executed by a computer or a processing unit of any other programmable data processing device generate an apparatus for implementing a specific function in one or more processes in the flowcharts and/or in one or more blocks in the block diagrams.

The foregoing specific implementations further describe the objectives, technical solutions in detail, and beneficial effects of the present invention. It should be appreciated that the foregoing descriptions are merely specific implementations of the present invention, but are not intended to limit the protection scope of the present invention. Any modification, equivalent replacement, or improvement made based on the technical solutions of the present invention should fall within the protection scope of the present invention.

The invention claimed is:

1. An electronic device, comprising:

one or more processors;

one or more memories; and a module at which a plurality of applications are installed, wherein the memory stores one or more programs, and when the one or more programs are executed by the processor, the electronic device is enabled to perform a method, the method comprising:

obtaining a first real image frame and a second real image frame;

processing, when a frame interpolation condition is satisfied between the first real image frame and the second real image frame, the first real image frame to obtain a first image from the first real image frame and a mask image of the first image, wherein the mask image is used for marking to-be-filled pixels and effective pixels in the first image, wherein the frame interpolation condition comprises that a moving distance between the first real image frame and the second real image frame is less than a distance threshold and there is no translucent object in the first real image frame;

sampling mask data of the mask image pixel by pixel to determine whether pixels in the first image are to-be-filled pixels; and reading, for any one of the to-be-filled pixels in the first image, color data of the first real image frame from an internal memory, and using the color data to perform color filling on the to-be-filled pixel in the first image, to generate a predicted image frame displayed between the first real image frame and the second real image frame, wherein color data of the effective pixels in the first image is retained.

2. The device according to claim 1, wherein after obtaining the first real image frame and the second real image frame, the method further comprises:

determining whether there is a translucent object in the first real image frame;

calculating a first moving distance between the first real image frame and the second real image frame in response to that there is no translucent object in the first real image frame;

determining whether the first moving distance is less than the distance threshold;

determining, in response to that the first moving distance is less than the distance threshold, that the frame interpolation condition is satisfied between the first real image frame and the second real image frame; and determining, in response to that there is a translucent object in the first real image frame and/or the first moving distance is greater than or equal to the distance threshold, that the frame interpolation condition is not satisfied between the first real image frame and the second real image frame.

3. The device according to claim 1, wherein the reading color data of the first real image frame from an internal memory, and using the color data to perform color filling on the to-be-filled pixel in the first image comprises:

determining at least one candidate reference pixel of the to-be-filled pixel in the first image;

determining a target reference pixel from the at least one candidate reference pixel based on object categories to which candidate reference pixels respectively belong;

determining, based on a relationship between the target reference pixel and the first real image frame, color data of the target reference pixel by reading the internal memory; and performing the color filling on the to-be-filled pixel based on the color data of the target reference pixel.

4. The device according to claim 3, wherein the determining a candidate reference pixel of the to-be-filled pixel in the first image comprises:

randomly moving to a first position in the first image with a position of the to-be-filled pixel as a starting point;

determining, if a pixel at the first position is not a to-be-filled pixel, that the pixel at the first position is the candidate reference pixel of the to-be-filled pixel; and if the pixel at the first position is a to-be-filled pixel, continuing to randomly move in the first image with the first position as the starting point until moving to a second position where a pixel is not a to-be-filled pixel, and determining the pixel at the second position as the candidate reference pixel of the to-be-filled pixel.

5. The electronic device according to claim 1, wherein the first real image frame and the second real image frame are consecutive real image frames.

6. A non-transitory computer-readable storage medium, comprising:

a computer program, which when executed by a processor, cause the processor to perform operations comprising:

obtaining a first real image frame and a second real image frame;

processing, when a frame interpolation condition is satisfied between the first real image frame and the second real image frame, the first real image frame to obtain a first image from the first real image frame and a mask image of the first image, wherein the mask image is used for marking to-be-filled pixels and effective pixels in the first image, wherein the frame interpolation condition comprises that a moving distance between the first real image frame and the second real image frame is less than a distance threshold and there is no translucent object in the first real image frame;

sampling mask data of the mask image pixel by pixel to determine whether pixels in the first image are to-be-filled pixels; and reading, for any one of the to-be-filled pixels in the first image, color data of the first real image frame from an internal memory, and using the color data to perform color filling on the to-be-filled pixel in the first image, to generate a predicted image frame displayed between the first real image frame and the second real image frame, wherein color data of the effective pixels in the first image is retained.

7. The non-transitory computer-readable storage medium according to claim 6, wherein the first real image frame and the second real image frame are consecutive real image frames.

8. The non-transitory computer-readable storage medium according to claim 6, wherein after obtaining the first real image frame and the second real image frame, the processor is further configured to perform operations comprising:

determining whether there is a translucent object in the first real image frame;

calculating a first moving distance between the first real image frame and the second real image frame in response to that there is no translucent object in the first real image frame;

determining whether the first moving distance is less than the distance threshold;

determining, in response to that the first moving distance is less than the distance threshold, that the frame interpolation condition is satisfied between the first real image frame and the second real image frame; and determining, in response to that there is a translucent object in the first real image frame and/or the first moving distance is greater than or equal to the distance threshold, that the frame interpolation condition is not satisfied between the first real image frame and the second real image frame.

9. The non-transitory computer-readable storage medium according to claim 6, wherein in reading color data of the first real image frame from an internal memory, and using the color data to perform color filling on the to-be-filled pixel in the first image, the processor is further configured to perform operations comprising:

determining at least one candidate reference pixel of the to-be-filled pixel in the first image;

determining a target reference pixel from the at least one candidate reference pixel based on object categories to which candidate reference pixels respectively belong;

determining, based on a relationship between the target reference pixel and the first real image frame, color data of the target reference pixel by reading the internal memory; and performing the color filling on the to-be-filled pixel based on the color data of the target reference pixel.

10. A data processing method, comprising:

obtaining a first real image frame and a second real image frame;

processing, when a frame interpolation condition is satisfied between the first real image frame and the second real image frame, the first real image frame to obtain a first image from the first real image frame and a mask image of the first image, wherein the mask image is used for marking to-be-filled pixels and effective pixels in the first image, wherein the frame interpolation condition comprises that a moving distance between the first real image frame and the second real image frame is less than a distance threshold and there is no translucent object in the first real image frame;

sampling mask data of the mask image pixel by pixel to determine whether pixels in the first image are to-be-filled pixels; and reading, for any one of the to-be-filled pixels in the first image, color data of the first real image frame from an internal memory, and using the color data to perform color filling on the to-be-filled pixel in the first image, to generate a predicted image frame displayed between the first real image frame and the second real image frame, wherein color data of the effective pixels in the first image is retained.

11. The method according to claim 10, wherein after obtaining the first real image frame and the second real image frame, the method further comprises:

determining whether there is a translucent object in the first real image frame;

calculating a first moving distance between the first real image frame and the second real image frame in response to that there is no translucent object in the first real image frame;

determining whether the first moving distance is less than the distance threshold;

determining, in response to that the first moving distance is less than the distance threshold, that the frame interpolation condition is satisfied between the first real image frame and the second real image frame; and determining, in response to that there is a translucent object in the first real image frame and/or the first moving distance is greater than or equal to the distance threshold, that the frame interpolation condition is not satisfied between the first real image frame and the second real image frame.

12. The method according to claim 10, wherein the reading color data of the first real image frame from an internal memory, and using the color data to perform color filling on the to-be-filled pixel in the first image comprises:

determining at least one candidate reference pixel of the to-be-filled pixel in the first image;

determining a target reference pixel from the at least one candidate reference pixel based on object categories to which candidate reference pixels respectively belong;

determining, based on a relationship between the target reference pixel and the first real image frame, color data of the target reference pixel by reading the internal memory; and performing the color filling on the to-be-filled pixel based on the color data of the target reference pixel.

13. The method according to claim 12, wherein the determining a candidate reference pixel of the to-be-filled pixel in the first image comprises:

randomly moving to a first position in the first image with a position of the to-be-filled pixel as a starting point;

determining, if a pixel at the first position is not a to-be-filled pixel, that the pixel at the first position is the candidate reference pixel of the to-be-filled pixel; and if the pixel at the first position is a to-be-filled pixel, continuing to randomly move in the first image with the first position as the starting point until moving to a second position where a pixel is not a to-be-filled pixel, and determining the pixel at the second position as the candidate reference pixel of the to-be-filled pixel.

14. The method according to claim 12, wherein the performing the color filling on the to-be-filled pixel based on the color data of the target reference pixel comprises:

determining effective color data of the target reference pixel based on a weight corresponding to the target reference pixel and the color data of the target reference pixel;

accumulating the effective color data into existing color data of the to-be-filled pixel until a quantity of color accumulations of the to-be-filled pixel is equal to a first threshold to obtain current color data of the to-be-filled pixel;

dividing the current color data by the first threshold to obtain first color data of the to-be-filled pixel; and writing the first color data to a position of the to-be-filled pixel in the first image.

15. The method according to claim 10, wherein the processing the first real image frame to obtain a first image and a mask image of the first image comprises:

using, based on object categories to which pixels in the first real image frame respectively belong, a motion vector to perform an image warp operation twice on the first real image frame to generate the first image; and generating the mask image of the first image based on whether color data exists for the pixels in the first image.

16. The method according to claim 10, wherein the processing the first real image frame to obtain a first image and a mask image of the first image comprises:

generating a stencil buffer of the first real image frame based on object categories to which the pixels in the first real image frame respectively belong;

querying the stencil buffer, and determining object categories to which pixels in a mask texture image respectively belong, wherein the mask texture image is an image of which initial values are all equal to a first value, and the first value is used for marking the to-be-filled pixels in the first image; and using, based on the object categories to which the pixels respectively belong, a motion vector to perform an image warp operation twice on both the first real image frame and the mask texture image to generate the first image and the mask image of the first image.

17. The method according to claim 16, wherein the using, based on the object categories to which the pixels respectively belong, a motion vector to perform an image warp operation twice on both the first real image frame and the mask texture image to generate the first image and the mask image of the first image comprises:

using a multiple render targets MRT technology to perform a first image warp operation corresponding to the motion vector simultaneously on pixels in the first real image frame belonging to a first object category and pixels in the mask texture image belonging to the first object category to generate a warped first real image frame and a warped mask texture image; and performing a second image warp operation corresponding to the motion vector simultaneously on pixels in the warped first real image frame belonging to a second object category and pixels in the warped mask texture image belonging to the second object category to generate the first image and the mask image of the first image, wherein the first object category is a static object, and the second object category is a dynamic object, or the first object category is a dynamic object, and the second object category is a static object.

18. The method according to claim 10, wherein the sampling mask data of the mask image pixel by pixel to determine whether pixels in the first image are to-be-filled pixels comprises:

sampling mask data of pixels in the mask image pixel by pixel;

determining, if the mask data of the sampled pixels is equal to a first value in the mask image, that a pixel at a corresponding position in the first image is a to-be-filled pixel; and determining, if the mask data of the sampled pixels is equal to a second value, that the pixel at the corresponding position in the first image is not a to-be-filled pixel.

19. The method according to claim 18, wherein the mask image is a binary image, the first value is equal to 1, and the second value is equal to 0.

20. The method according to claim 10, wherein the first real image frame and the second real image frame are consecutive real image frames.

* * * * *